US012245730B2

(12) United States Patent
Jakhotia et al.

(10) Patent No.: US 12,245,730 B2
(45) Date of Patent: Mar. 11, 2025

(54) SYSTEMS AND METHODS FOR ENABLING NAVIGATION IN ENVIRONMENTS WITH DYNAMIC OBJECTS

(71) Applicant: Carnegie Robotics, LLC, Pittsburgh, PA (US)

(72) Inventors: Anurag Jakhotia, Pittsburgh, PA (US); Andrew James Somerville, Pittsburgh, PA (US); David Larose, Pittsburgh, PA (US); John Paul Thomas Atkinson, Pittsburgh, PA (US)

(73) Assignee: Carnegie Robotics, LLC, Pittsburgh, PA (US)

( * ) Notice: Subject to any disclaimer, the term of this patent is extended or adjusted under 35 U.S.C. 154(b) by 340 days.

(21) Appl. No.: 17/488,764

(22) Filed: Sep. 29, 2021

(65) Prior Publication Data

US 2022/0095871 A1 Mar. 31, 2022

Related U.S. Application Data

(60) Provisional application No. 63/085,471, filed on Sep. 30, 2020.

(30) Foreign Application Priority Data

Oct. 19, 2020 (EP) .................................... 20202492

(51) Int. Cl.
*A47L 11/40* (2006.01)
*G05D 1/00* (2006.01)
*G06T 7/73* (2017.01)

(52) U.S. Cl.
CPC ........ *A47L 11/4011* (2013.01); *G05D 1/0221* (2013.01); *G05D 1/0238* (2013.01);
(Continued)

(58) Field of Classification Search
None
See application file for complete search history.

(56) References Cited

U.S. PATENT DOCUMENTS

| 2016/0302639 A1 | 10/2016 | Lindhé et al. |
| 2017/0364088 A1 | 12/2017 | Grufman et al. |

(Continued)

FOREIGN PATENT DOCUMENTS

| EP | 3508937 A1 * | 7/2019 | ............. A47L 11/28 |
| WO | 2020098456 A1 | 5/2020 | |

OTHER PUBLICATIONS

Office Action from corresponding European Application No. 20202492.3, Jul. 12, 2023.

(Continued)

*Primary Examiner* — Jonathan L Sample
*Assistant Examiner* — Alan Lindsay Ostrom
(74) *Attorney, Agent, or Firm* — Workman Nydegger

(57) ABSTRACT

An indoor mobile industrial robot system is configured to provide a weight to a detected object within an operating environment, where the weight relates to how static the feature is. The indoor mobile industrial robot system includes a mechanism configured to translate reflected light energy and positional information into a set of data points representing the detected object having at least one of Cartesian and/or polar coordinates, and an intensity. If any discrete data point within the set of data points representing the detected object has an intensity at or above a defined threshold the entire set of data points is converted into a weight and potentially classified representing a static feature, otherwise such set of data points is classified as representing a dynamic feature having a lower weight.

9 Claims, 8 Drawing Sheets

(52) U.S. Cl.
CPC .............. *G05D 1/0274* (2013.01); *G06T 7/73* (2017.01); *A47L 2201/04* (2013.01)

(56) References Cited

U.S. PATENT DOCUMENTS

| | | | |
|---|---|---|---|
| 2018/0314921 A1* | 11/2018 | Mercep | G01S 15/86 |
| 2018/0341271 A1* | 11/2018 | Blayvas | G05D 1/0274 |
| 2019/0213438 A1* | 7/2019 | Jones | G06V 40/10 |
| 2019/0217857 A1* | 7/2019 | Sorin | G05D 1/0274 |
| 2019/0258737 A1* | 8/2019 | Wang | G06F 16/287 |
| 2019/0265721 A1* | 8/2019 | Troy | G06T 7/70 |
| 2019/0369640 A1 | 12/2019 | He et al. | |
| 2020/0300639 A1* | 9/2020 | Salfity | G06T 7/11 |
| 2021/0293548 A1* | 9/2021 | Sørensen | G01C 21/206 |

OTHER PUBLICATIONS

Extended Search Report from corresponding EP Application No. 20202492.3, Aug. 9, 2021.
Office Action from corresponding European Application No. 20202492.3, Dec. 7, 2022.

* cited by examiner

SYSTEMS AND METHODS FOR ENABLING NAVIGATION IN ENVIRONMENTS WITH DYNAMIC OBJECTS

TECHNICAL FIELD

The present disclosure relates generally to mobile robotic systems, and more particularly to systems and methods for improved autonomous navigation of indoor mobile robotic systems within an operating environment.

BACKGROUND

Indoor mobile industrial robots are programmable machines configured to autonomously navigate within an indoor industrial setting, often while performing one or more tasks. One recognized deficiency with autonomous mobile robotic systems is the general inability of such machines to recognize their surroundings and adequately react to changes within a given operating environment. Navigation is a key function in an autonomously driving mobile industrial robot. Regarding navigation, one particular challenge is seen when features previously relied on for navigation within the operating environment are no longer there or have been moved. In general, indoor mobile industrial robot navigation systems struggle with an inability to cope with objects that are not of a static nature. Many algorithms for Simultaneous Localization and Mapping (SLAM) initially assume that what is detected is static and may be expected to be at the same position next time that position is visited.

Relevant technology may be seen in EP3508937, US2016/302639, US2019/369640 and WO2020/098456.

Embodiments of the present disclosure address this concern.

SUMMARY OF THE DISCLOSURE

In a first aspect, the invention relates to a navigation system for navigating a robot unit, comprising one or more remote sensors, in a scene or venue, the scene/venue comprising a number of features, the system comprising a controller configured to:
- at each of a plurality of points of time:
  - receive an output from the sensor(s),
  - determine, from the output, a plurality of features, and determine a position of each determined feature, and
  - allocate, to each recognized feature, a weight increasing with a number of points in time at which the feature is determined at at least substantially a same position and
  - determine a position of the robot unit vis-à-vis the position(s) of the determined feature(s) based on the weight allocated to each feature.

In this context, a navigation system is a system capable of determining a position of the robot unit and/or determining in which direction to move the robot unit.

The robot unit is for navigating in a scene or venue, which may be any type of environment, such a room, facility, storage room, production space, terminal, warehouse, store, waiting room, terminal, sports arena, indoor, outdoor, in the air or underwater or the like.

A robot unit often is a self-propelled unit which needs no human operator to navigate the scene or venue. The robot unit may have means for moving the robot unit, such as wheels, tracks, or the like. Robot units may be configured to move on land, under water, on the water, and/or in the air. The unit may be driven by one or more motors, engines or the like, such as an electrical motor. The robot unit may be powered by e.g. a cable, or the unit may comprise its own power source, such as a battery, fuel container, solar cells, fuel cell or the like.

The robot unit comprises one or more remote sensors for determining features, often in a vicinity of the unit. Features may be static or dynamic, where a static feature is a feature which the unit may assume will not move or change position within a predetermined period of time, such as one second, one minute, one hour, one day, one week or the like. Static features may be fixed structures, such as walls, pillars, racks, fences, building structures, heavy furniture or elements, storage elements, or the like. Clearly, this division into classes is an approximation, as features may be partly static and partly dynamic (e.g. swaying branches on a tree), or may be static at some times and dynamic at others.

Dynamic features, on the other hand, may be features which may be moving, such as in relation to the earth or the ground, or which may be expected to move or change position/rotation within one second, one minute, one hour, one day, one week or the like. A dynamic feature may be a feature which cannot be expected to be in the same position the next time the robot unit reverts to the present position of the feature. Dynamic features may be persons/animals, luggage, packets, pallets, bicycles, cars, vehicles, trailers, campers, but also lightweight furniture and the like, like chairs, tables, plants, and the like.

The time frame may vary, so that in some embodiments, even lightweight furniture or the like may be seen as static structures, such as if the same position is re-visited within minutes, whereas even more heavy furniture, such as sofas and tables, may be seen as dynamic features if the position is revisited only once a month. Clearly, "static" need not be completely and perpetually immovable. Further below, methods of handling situations with partially static features are described.

Thus, to take into account the "staticness" or degree to which a feature is static or dynamic, the features are allocated a weight describing how static or dynamic they are. This will be described further below.

The robot's remote sensor(s), which is/are capable of sensing features remote to or at a distance from the sensors, may be based on any technology, such as stereo vision, lidar, radar, sonar, or the like. The remote sensor is a sensor with remote sensing capability. Any combination of such technology may be used. Preferably, the sensor(s) is/are configured to determine a position of a feature vis-à-vis the robot. Such technology may also be termed collision avoidance technology, as it is often used for assisting a robot in not colliding with obstacles in its vicinity during navigation in a scene or venue.

The system comprises a controller which may be any type of controller, software controlled or hardwired. The controller may be a processor, ASIC, FPGA, DSP, or the like. The operation of the controller may be divided so that different portions of the functionality are performed on different hardware or even different types of hardware, which then usually would be in communication. Part of the functionality may be performed remotely, such as on a server, such as in a cloud solution.

The controller is configured to receive an output from the sensor(s). This output may be received via wires and/or wirelessly. The output may have any desired form. The output may be more or less raw sensor output, such as images from a stereo camera set-up, the received signals output from a lidar, or the like. Alternatively, the sensor(s) may comprise their own processor or the like for converting sensor data into more processed data, such as data representing positions, often relative to the robot or in a predetermined coordinate system, which may more easily be interpreted by the controller.

In this respect, a feature may be a physical object, such as a piece of furniture, a wall, structural element, such as a pillar, a piece of luggage, a storage rack or the like. A feature, however, may also be a characteristic of a physical object, such as a characteristic of a surface thereof or an element attached to the physical object. A feature thus may be a surface color or pattern thereof, surface shape, surface reflectivity, physical appearance, emission characteristics of the physical object or an element attached thereto, such as if having a fluorescent surface or pattern of fluorescence. A feature may also be detected in sensor data based on mathematical properties, such as scale space maxima or image gradients. Examples of this type of feature include Harris corners, SIFT features, SURF features and the like.

The features may be determined in any manner, such as from a presence thereof. A feature may be any element detected by the sensor(s). Often combinations of sensors are used; often called sensor fusion. The sensor output may be filtered or otherwise processed so that features determined fulfill certain requirements, such as a size thereof, a dimension thereof or the like. Clearly, also other characteristics may be used, such as a reflectivity thereof, a shape thereof, or even a color thereof.

For each determined feature, a weight is determined. This weight may relate to a degree of staticness or lack of movement thereof. A higher weight may then be allocated to a feature not moving or moving less often than another feature that then has a lower weight. Often, a weight is a number, such as an integer or a real number, often between a lower limit and an upper limit, such as between 0 and 1 or between 0 and 100. Clearly, inverting the weight so that more stationary features have a lower weight will be completely analogous.

It may be desired to, between the determined feature(s), recognize one or more static features. A static feature may be recognized based on a number of different characteristics, which will be described in detail further below. Static features may be recognized based on their shape, reflectivity, type, size, outline, or the like thereof. Static features may be seen as all features having a weight above a threshold weight, such as 0.5 or 50.

In some situations, a feature may be given a higher weight, and/or recognized as static, when multiple visits over time reveal the same feature in the same position. Thus, even if the feature is of a type or has characteristics characteristic of dynamic features, the feature may be allocated a higher weight or recognized as static if it actually is in at least substantially the same position at least sufficiently frequently. The weight may be determined based on how often the feature is seen in the same position, such as within 1 m, such as within 50 cm, such as within 10 cm, such as within 1 cm. The weight may be increased for each instance in which the feature is seen in that position and decreased for each time the feature is not. The weight thus may vary over time for each time the robot is at the position and thus able to determine the feature if in that position. Alternatively, the weight may be allocated based on other data, such as data or output relating to a type or category of feature. For example, a wall is assumed very static and thus given a very high weight, where as a chair will be assumed much more dynamic and allocated a much lower weight. A table would be assumed between these extremes and allocated a weight accordingly. The weights may also vary based on factors not directly associated with the feature, such as the duration of time since the last observation of the feature, whether the feature is located in an area of hiho or low activity, or other environmental factors. Other manners of allocating weights are described below.

From the feature weights, such as the features with higher weights or weights above a threshold limit, the position of the robot vis-à-vis this feature or these features may be determined. Often, position determination based on low weight or dynamic features is problematic, especially if the position desired is a position in a fixed coordinate system, such as a coordinate system of the scene or venue.

It is noted that the position of the robot may also be determined based on the positions determined for each of the features.

Clearly, a collision avoidance sensing scheme would be useful irrespective of whether the features detected are static or dynamic or have a high or low weight, but when determining a position of the robot in the scene or venue, relying on dynamic features or with low weight could be problematic. Furthermore, a collision avoidance sensing scheme may itself take into account both the weight and the observed motion of the features.

Determining the position based on the static features or features with high weight acts to render the reliability of the position determination high.

In one embodiment, the controller is further configured to determine the position only from the features with a weight above a threshold weight, such as sufficiently static feature (s). As mentioned, the more dynamic features may be relevant for collision avoidance, but the position is determined, in this embodiment, leaving out the more dynamic features.

In one embodiment, the system further comprises a storage comprising information representing a position of each of a number of the features. These features may be all features or features with a weight above a threshold weight. In one situation, the information may be a map or may represent a map of the scene or venue and comprising therein the positions of the features of the storage. Thus, the controller may then be configured to determine a position of the robot unit in the scene or venue based on the information of the storage and the determined position of the robot unit vis-à-vis the recognized feature(s).

A map may be represented in any desired manner, such as by a plurality of positions at which features are present or expected. The weights of the features may also be represented. Different manners of representing such information are provided below.

Clearly, in the above situations and in the below situations, embodiments and aspects, the positions may be 2D or 3D positions. A position may be two-dimensional such as in the situation of a robot driving on a planar or nearly-planar floor. Robots may, however, move in three dimensions, and a position may be three-dimensional.

Even in situations where the robot moves only or predominantly in two dimensions, information may be taken into account also in a third dimension, such as if a feature is recognized which has a wider outline at one height and a more narrow outline at another height. In that situation, the extent of the robot at these heights may be taken into account when determining e.g. a relative distance between the feature and the robot.

When the features determined or recognized are not in complete coherence with the features of the map, robots may have problems. Thus, using only recognized features when searching in the map for a correspondence, to identify a position of the navigation system in the map, dynamic or lower weight features may be ruled out so that a more probable or correct position is determined. In the search in the map for correspondence with features comprising also dynamic or low weight features, an erroneous position might be determined.

In one embodiment, the controller is configured to recognize a determined feature as static by the feature being represented in the storage, such as when only features with a weight above a threshold weight are included in the storage. Thus, when the feature is present in the storage, such as in the map, it may have been detected at that position before, so that the feature may be expected to be static, as it is detected in at least substantially the same position.

In that situation or alternatively, the controller may be configured to update the storage with information representing a recognized feature of a sufficient weight. Thus, if the recognized feature is not in the storage, it may be added to the information so as to be represented in the future.

In one embodiment, the same map or information is shared by multiple robots, some of which are not configured to update the information or map. Thus, from the updating performed by the present system or robot, other robots may now receive an updated map and may thus navigate using the updated map.

Another aspect of the invention relates to a method of operating a navigation system for navigating a robot unit in a scene or venue, the scene/venue comprising a number of static features and a number of dynamic features, the method comprising:
at each of a plurality of points of time:
one or more remote sensors of the robot unit outputting information representing surroundings of the robot unit,
determining, from the information, a plurality of features,
determining a position of each feature, and
allocating, to each recognized static feature, a weight increasing with a number of points in time at which the feature is determined at at least substantially a same position, and
determining a position of the robot unit vis-à-vis the recognized static feature(s) based on the weight allocated to the pertaining recognized feature(s).

Naturally, all aspects, embodiments, situations and the like may be interchanged. The above description is equally relevant to the below description.

The robot/navigation system, features, static nature, dynamic nature, sensors, information output and the like may be as described above and below.

The method comprises the sensor(s) outputting the information representing surroundings of the robot. Often, the sensors are configured to determine any features, obstacles or the like in the surroundings of the robot. In addition to determining whether features are static or dynamic, the sensor output may be used for ensuring that the robot does not collide with a feature or obstacle.

The surroundings may comprise a surface on which the robot moves, or a medium through which the robot moves, and/or features detectable by/from the robot. The sensors may be based on vision or emission/reflection of radiation of any type. Thus, the surroundings detected may be visible from the robot, so that line of sight is desired to at least the nearest features.

From the information output from the sensor(s), a plurality of features is determined. A feature may be a separate, coherent or interconnected, feature in the information. Multiple features may in fact be a single feature, if the full extent of that feature was known. A U-shaped storage rack, for example, may initially be seen as two different features if the U is viewed from above and it is not possible to detect or sense the bottom thereof. If that feature is recognized or determined to be static, so would the portions thereof, so that it may not be problematic that not all of a feature is sensed at the same time.

As described, one or more static features are recognized, and the position is determined vis-à-vis these features.

In one embodiment, the method further comprises determining, from the information, one or more static tures, such as features with a weight above a threshold weight, and wherein the determining step comprises determining the position only from these feature(s). Thus, when dynamic (lower weight) features are detected or determined, these are not, in this embodiment, taken into account when determining the position.

In one embodiment, the method further comprises providing a storage comprising information representing a position of each of a number of the features. As mentioned above, this information may represent or be in the form of a map of the scene or venue or a portion thereof, where the positions of the features, such as the features having a weight above a threshold weight, are represented. A robot or navigation system may use this map for navigating in the scene or venue. The robot may determine its position in the scene or venue or map by comparing its relative position(s) to the recognized features, the positions of which are represented in the information.

This information may be provided in any manner. In one manner, the information may be generated or updated with or by information as to the position of a feature, such as if the position of the robot is known. Then, the information of a feature may be added or updated in the information, as is described below.

In one embodiment, the recognizing step comprises recognizing a determined feature as static or of a sufficiently high weight by the feature being represented in the storage.

The method further comprises the step of determining a position of the robot unit vis-à-vis the positions of the determined features and based on the weights. This may be a position determination in the scene or venue based on the information of the storage and the determined position of the robot unit vis-à-vis the recognized static feature(s). This may be obtained using knowledge of the positions of the features in the scene or venue. When the weights are taken into account, it is not required to make a sharp distinction between static and dynamic, as the weight may be used for indicating a confidence of the position of the feature. The higher the weight the more confident we can be of its position and the more weight can be put on this position in the determination of the position of the robot unit. Naturally this information may be found from the above information and/or the map if provided.

One embodiment further comprises the step of updating the storage with information representing a recognized feature, such as a feature with a sufficient weight. In this manner, newly recognized features may be added to the information, or information may be updated if a represented feature is no longer there or has moved, and now has a too low weight. As described above, higher-weight features may not be required to be at the same position all the time. A higher-weight feature may be determined in another position and the corresponding information updated. When moved too far away or too often, that feature's weight may, however, be affected.

In one embodiment, the controller is configured to recognize a feature as a static feature when the feature is positioned at at least substantially the same position at at least a predetermined minimum number of points in time.

Thus, over time, the features have their positions determined based on the output of the sensor(s). Then, a feature is recognized as sufficiently static when it is positioned at at least substantially the same position a sufficient number of times or with a sufficient minimum frequency. The sufficient number of times may be a minimum number of determinations at that position within an overall time interval, such as at least 3 times during the last 24 hours, at least 3 times during the last week or the like.

However, robots may perform runs or operate infrequently, such as at only when required. Thus, the staticness of a feature may be determined from either how often the feature is in the same position or how often a position is occupied. Thus, the staticness of a feature, i.e. how likely it is that it still is in a position, X, may be increased each time the position X is detected and is found occupied. This staticness may be a weight or percentage which is increased, such as by e.g. 10% (until 100% is reached) or by an increasingly reduced percentage, such as by x percent of "100%-the present percentage", so that the staticness more and more slowly approaches (but can then not reach) 100%. If the feature is moved and/or the position X is not occupied, the percentage may be reduced, such as by half or 50%. Naturally, the staticness of a feature may also be updated in other ways that account for the properties of the sensor(s), stochastic models of the environment, etc.

Thus, the staticness or weight may be an occupancy in the sense that an occupancy of a position may be equally good for navigation as a stationary feature, as long as the same position is occupied. Then, it will not matter what occupies the position. A cone and a bucket swapping positions, but otherwise being in the same positions, will be as good for navigation as the cone/bucket remaining stationary.

When a feature is, at a first point in time, detected at position X, the occupancy of position X (and the staticness of the feature) may be increased. If the feature later is detected at position Y, where position X is no longer occupied, the staticness of the feature may be reduced, as may the occupancy of position X, whereas the occupancy of position Y may be increased.

In fact, all positions in the map or scene/venue may be handled in this manner, where each position is allocated an occupancy/weight which is increased or decreased based on the latest detection of the position and whether the position is occupied or not. Constantly and reliably occupied positions form a good basis for navigation.

Also, a single run or operation, such as a floor cleaning routine, may visit or detect the same feature or position multiple times within the same run and thus during a limited period of time. In such situations, all detections of a feature or a position may be taken as a single detection in order to not have e.g. the above manner of increasing and decreasing the staticness and/occupancy exaggerate the staticness and/or occupancy by assuming that the feature is very static (detected in the same position multiple times) and/or the position positively occupied, as it is detected to be so multiple times.

In this context, "at least the same position" may be a position within a maximum variation, such a position no more than 10 cm from an earlier position. The same position may also be a position within x, such as 3, times a positioning accuracy of the sensor(s) or the features in the map. In addition, or alternatively, the threshold of "the at least the same position" and/or the determination of the weight and/or the determination of static vs. dynamic may be performed via a learned model, such as a Convolutional Neural Network (CNN), through supervised, semi-supervised, or unsupervised training, and based on one or more of: data aggregated over multiple observations, the appearance of the feature, the appearance of the environment near the feature, and so forth.

It may be desired, such as if the feature is not rotationally symmetric, to require that the feature also has at least substantially the same rotational position, to be recognized as static. Clearly, the legs of a table will be at different positions if the table is rotated. Thus, if the features in question are the legs, or portions of the legs, the rotational position may not be relevant, whereas it may be relevant if the position is that of the table, such as the table centre.

Thus, it may be required that the feature is rotated no more than 20 degrees, such as no more than 10 degrees, such as no more than 5 degrees, often in relation to a coordinate system of the scene or venue and/or a predetermined axis, such as a vertical axis, to be recognized as static or at least substantially in the same position.

In this situation, the relative positions of the static or higher weight features may not be identical from time to time, so that it may be difficult to determine the relative position of the robot. However, adding a weight to each feature has the advantage that the weight may be correlated to the certainty with which the position of the pertaining feature is determined or known. This would also reduce the negative impact of the situation where a feature, which really is dynamic, has been erroneously added to the map as a static feature.

A feature may be allocated a large weight, if it is determined at the same position all the time, or if a learned model has high confidence in the feature being static. Then, the position determination may put more emphasis on that position than on a position of a feature having a low weight due to it occasionally shifting position, due to it occasionally not being present or due to a model having a low confidence in the feature being static.

Clearly, the weight may be allocated based on a frequency of an object being detected at the same position and/or at a certain position. The weight may alternatively or optionally be allocated based on how far the positions, at which the feature was detected, are from each other. Alternatively, the weight may be determined by a machine learning algorithm that predicts likelihood that the feature is reliable.

In one embodiment, the controller is configured to allocate, to each recognized feature, a weight increasing with a number of points in time at which the feature is determined at the at least substantially same position. In this situation, the "at least substantially the same position" may be a position within a maximum distance, such as within 50 cm, such as within 20 cm, such as within 10 cm, such as within 1 cm of a predetermined position, such as a former position, of the feature.

One embodiment further comprises a step of recognizing a feature which is positioned at at least substantially the same position at at least a predetermined minimum number of points in time as a static feature.

As mentioned above, the robot may e.g. move around in the scene or venue multiple times, such as regularly, so that the sensors sense the features at a plurality of points in time and thus output information relating to the features at such points in time. Then, the recognizing step may recognize a feature at different points in time. A feature which does not move or has moved only within the uncertainty or limit allowing it to be at least the same position may be recognized as static and given a high weight, as may a feature which was at that position at least a predetermined number of points in time. This predetermined number of times may be a minimum frequency, a minimum percentage of the times which the feature is sensed or the like.

The weight may relate to the probability that the feature is at that position and thus the reliability of the positioning of the feature. This reliability may then be taken into account when determining the position of the robot. More emphasis may be put on a more reliably positioned feature.

In one embodiment, the controller is configured to recognize a static feature as a determined feature which:
  emits or reflects an amount of radiation exceeding a predetermined minimum intensity or
  emits or reflects radiation at a predetermined wavelength.

A predetermined weight may be allocated to features emitting/reflecting a predetermined amount or wavelength. In addition or alternatively, the feature may emit or reflect radiation in a predetermined spatial or temporal pattern.

Thus, weight or a static feature may be determined due to its emission or reflection. Static features or features with a particular weight may be marked, tagged or the like with elements or surfaces which have the desired characteristics.

Reflection may be determined from the intensity received when the intensity output is known. Instead of reflection, scattering may be determined.

A surface may be fluorescent or may comprise a fluorescent material or compound which will absorb radiation and output radiation at one or more predetermined wavelengths. Such material/compound may be selected so that it outputs radiation in a wavelength which is not present or only present in a rather low intensity, so that detection of the wavelength points to a static feature being present. Alternatively, a filtering or correction may be performed if the wavelength in question is also emitted by other sources, such as lamps, the sun or the like, so that any contribution from such sources is subtracted to identify the static features.

Clearly, the wavelength may be a wavelength interval around or comprising the wavelength in question. Optical filters of most types are able to only define a wavelength interval. The width of the wavelength interval may be decided based on e.g. the wavelength of other radiation in the vicinity of the static feature(s).

A static feature may alternatively be recognized based on the size or amount/intensity of its emission or reflection. A static feature may have a large emission/reflection or may be provided with an element having such emission/reflection, so that it may be recognized based on the amount of radiation, such as within a particular wavelength, reflected and then usually detected by the sensor(s). In a simple embodiment, the static features may be provided with reflective elements or surfaces. Then, the initial determination that a feature is static may be made by e.g. an operator simply providing that surface, such as in the form of a fluorescent or reflective surface or element, such as a sticker or mirror. Subsequently, the feature may be recognized based on the emission/reflection.

A suitable sensor for identifying reflective or fluorescent elements or surfaces may be a sensor emitting radiation of a predetermined wavelength. Then, reflection may be determined at the same wavelength, where fluorescence may be determined at another wavelength, as the fluorescent material will convert radiation at one wavelength to radiation at another wavelength.

Naturally, a feature need only have a portion thereof having the sought-for characteristic, such as the reflection or emission. Once a sufficient emission/reflection/scattering has been identified, the complete feature preferably is recognized as a static feature. Thus, a complete extent of the feature may be determined, or as much of the feature as can be sensed by the sensors.

Alternatively, a color may be determined. All features with a predetermined color may then be assumed to be static and features of another color may be assumed to be dynamic.

In another embodiment, a bar code or the like may be provided on features. This bar code may be imaged by a sensor and deciphered by the controller. The bar code itself may describe that the feature is static, for example, or the information encoded therein may indicate whether the corresponding feature is static or dynamic.

In one embodiment, the step of recognizing a static feature comprises determining, as static, features which:
  emit or reflect an amount of radiation exceeding a predetermined minimum intensity, or
  emit or reflect radiation at a predetermined wavelength.

Again, a particular amount or wavelength may be correlated to a particular weight.

As mentioned above, the wavelength may be selected in a number of manners, for example as a wavelength which is not present or not present to any significant degree in the surroundings. A radiation source may be provided for directing radiation on to the features, such as with a predetermined radiation intensity so that a reflection percentage may be determined. The distance to the feature may be taken into account in this respect.

A radiation emitter may also be useful for e.g. causing fluorescence emission if desired.

Optical filters, lenses and the like may be used as known in the art for setting up the detection and any irradiation.

In one embodiment:
  one of the remote sensors is configured to output information representing a visible characteristic of each feature and
  the controller is configured to recognize, as static features, features with one or more of a plurality of predetermined visible characteristics.

Then, the weight may be correlated to the characteristic. Different characteristics may have different weights.

In this context, a visible characteristic may be a shape, a color, relative dimensions, a surface characteristic, such as a roughness, surface structure, surface shape or contour, a mathematical property such as SIFT feature vector or the like, or combinations and/or patterns thereof.

In a simple embodiment, the visible characteristic may be a color. All features with a predetermined color may then be assumed to be static or a particular type of object, such as a storage rack. Then, if the predetermined color is red, red objects are taken as static, whereby e.g. storage racks may be red. Alternatively, lightweight furniture may be selected with a particular color so that they may easily be determined as dynamic.

Another visible characteristic may be an outline or shape thereof, such as in a 2D image. Thus, a bicycle is distinguishable from a chair and a table from an outline of the frame and the wheels compared to the legs and the seat, back rest or table top. Then, the feature may be recognized or categorized as belonging to a category of products, such as chair, a table, a pallet, a rack, a wall, a pillar, a suitcase or the like. A chair may be generally defined and compared to an image or sensing of a chair. If a sufficient correspondence is seen to determine that the feature is a chair, the controller may then comprise information relating to whether chairs are generally seen as static or dynamic features.

In fact, in one embodiment, the system may further comprise a storage available to the controller and in which information is stored relating to each category of a plurality of feature categories, wherein the controller is configured to:
- categorize a feature into a first category of the plurality of categories,
- recognize a feature as a static feature if the information, in the storage, relating to the first category, reflects that features of the first category are static features.

Then, a different category may be allocated a different weight. Other features may be categorized into other categories.

As mentioned, the categorization may be based on visual or surface characteristics or any other manner of categorizing a feature, such as from a weight thereof, a volume thereof, a size thereof, whether it has or does not have e.g. wheels, or the like.

The storage may then hold information as to whether features of a particular category, such as chairs, tables, vehicles, cars, luggage, pallets, walls, pillars or the like, are considered static or not. The storage may also hold the corresponding weights. Different categories may be allocated different weights.

Thus, the predetermined visible characteristics, or other manners of categorizing features, may be coupled to information relating to whether a feature with predetermined characteristics, such as a category of products, may be taken as dynamic or static and/or which weights to allocate. Once a feature has been determined to have predetermined visible characteristics, the weight and/or a determination of whether that feature is dynamic or static may be simply derived.

Then, different predetermined characteristics, such as the outline or sensing output of different types of features, such as pillars, walls, grids, chairs, tables, storage racks and the like may be presented to an operator which may then enter the weight or information as to whether features with such characteristics are static or dynamic. Alternatively, classifier engines are readily available which are able to categorize features such as from images thereof. Such tools would be quite suitable in this situation.

Naturally, a recognition or classification may not be certain. The feature may be recognized with a certainty of less than 100% to be e.g. a table, as it may also resemble a chair, so that the feature could be a chair with a small certainty. Thus, this weighting in the certainty of the recognition or classification may, in addition to the weighting of the staticness, be taken into account.

Also, recognized or classified features may be provided in the subsequent procedures with a predetermined probability/weight of them, or the class of features/products, being static. A probability or weight may be defined as a percentage and/or within a range, such as between 0 and 100 or between 0 and 1 or the like. Tables may in general be assumed to be X percent static, where X<100% but may be relatively high, as tables may sometimes be moved. Chairs, on the other hand could in general be seen as only Y percent static, where Y is rather low, as chairs are often moved. Fixed pillars then may be seen as 100% or close to 100% static, as may storage racks and the like. The information in the above storage may thus be such information where "fixed" may be quantified between "assumed very dynamic" and "assumed fully stationary".

Thus, when classifying features, the features can be grouped into classes, where a weight or probability of staticness may then be allocated to each class. In addition, a confidence or weight may be allocated to the classification itself. From the output of the detector(s), it may not be clear to which class an object or obstacle belongs. Thus, the classification itself may be allocated a weight together with the weight allocated to the class.

The operator may also assist the controller in determining a correspondence between the sensor output and predetermined visible characteristics and/or automatically allocated category. Thus, the predetermined visible characteristics may form a model describing groups or classes of features, such as luggage, chairs, bicycles or the like. An operator may assist the controller, where the sensor output may be coupled to an operator input, where the operator views the feature sensed and informs the controller what type of feature it is.

In addition to the position of the feature, it may be desired to also determine a rotation thereof. Then, the predetermined visible characteristics may take into account the fact that features, such as bicycles and chairs, look differently seen from different angles.

In one embodiment:
- the sensor(s) is/are configured to detect one or more predetermined surface characteristics of a determined feature and
- the controller is configured to compare the surface characteristics of the determined feature to predetermined surface characteristics and allocate a weight and/or recognize the determined feature as a static feature if the comparison identifies a match.

Again, the predetermined surface characteristics may be a color, surface roughness, shape, reflectivity, scattering, emission, a print or other visible information may be provided or the like. Then, from such characteristics, the feature may be allocated a weight and/or recognized as static or dynamic. Again, it may be desired that an operator is available for training the controller to allocate the weight and/or determine whether a feature is static or dynamic.

Object recognition and/or classification may alternatively be performed automatically. A number of engines and products exist which are able to determine an object, such as a face but also animals and other elements, in images. Clearly, a product of that type may be special purpose built taking e.g. into account the types of features which are most often encountered in the scene or venue, but a number of products are available off-the-shelf, such as when developed for computer vision.

Many computer vision products operate on standard 2D images, whereas it may be decided to provide a more complex product taking into account more data or information. When multiple sensors are employed, such as both a camera and a lidar, both 2D and 3D data are available which may make the classification and/or recognition much more precise. In one example, a table may be recognized from an image, but not its size. That information may be derived from lidar data.

Clearly, any type of processing may be employed in this context. Cloud based tools already exist. If a more local solution is desired, such as one which may be provided on a robot, many types of processors or even AI solutions exist, such as neural networks of different types. The training of such solutions is known to the skilled person. This training may be a manual training where a number of features are presented to the sensors and an operator may input the correct classification, weight and/or type thereof. Alternatively, this training may be unsupervised or semi-supervised, wherein the observed motion of features over time is itself used in the training of the solution.

Then, the automatic recognition and/or classification may be provided with any desired complexity using any type of local/remote solution or a combination thereof, and any data available may be used.

In general, the categorization or recognition of the feature may depend on a number of things. For example, a car may be seen as a dynamic feature, but if it is lying on the side or on the roof (upside down), it would be seen as a rather static element. A 20-ft container would be seen as a static element, but if it hangs from a crane, it could be rather dynamic. Thus, the recognition or categorization may be expanded to not only relate to the visual information, the outline thereof, a color or surface characteristic thereof, whether it has e.g. wheels or not, but also the context thereof.

Also, it could be desirable to initially have a plurality of categories or classes and then, if the features identified belonging to such categories/classes turn out to vary too much, in relation to weight or them being dynamic/stationary, to divide the features of a category/class into a number of categories/classes, such as subcategories/classes. If both cars standing on the wheels and tilted cars are often encountered, it may be decided to divide the class "car" into two subclasses "car on the wheels" and "tilted car". Each such class or category may have its own weight, so that the categorization again gives a realistic probability or weight.

In general, the position of the feature may be determined in the room or venue based on the sensors used. In one embodiment, the sensor(s) may comprise 3D vision or vision combined with movement so that the relative positions of the robot and the feature may be determined. In other embodiments, a Lidar is the main instrument in generating the map and the determining the relative positions, where a controller may determine the features from e.g. imaging and identify portions of the Lidar data corresponding to the feature to determine the position of the feature.

In one embodiment:
the outputting step comprises one of the remote sensors outputting information representing a visible characteristic of each feature and
the step of allocating a weight and/or recognizing features as static comprises recognizing features with one of a plurality of predetermined visible characteristics as static features.

As mentioned above, a visible characteristic may be an envelope of the feature, a projection thereof, as well as a color, surface texture, or any marking thereof, such as a bar code. Such surface texture, color, marking or the like may be provided on features in order to have these recognized as static.

One embodiment further comprises the steps of:
the sensor(s) outputting the information representing the visible characteristic of a feature,
receipt of a weight and/or information relating to whether the feature is static and
adding the visible characteristic to the predetermined visible characteristics if the weight is above a threshold weight and/or the received information relates to the feature being static.

Thus, the weight and/or the information relating to whether the feature is static may be received from a remote server, such as from a central server providing such information to many robots or controllers. Alternatively, or additionally, this weight/information may be fed to the controller by an operator, such as an operator viewing the feature being sensed and potentially recognized. This weight/information may be entered in any desired manner.

In one situation, the operator may comprise a monitor or display displaying a map and the feature in question so that the operator may recognize it and enter the weight or information of whether the feature is static or dynamic. Alternatively, the robot may move close to the feature so that the operator simply from the position of the feature may see the feature in question for which the weight/information is to be entered.

In one embodiment:
the outputting step comprises one or more of the sensor(s) detecting one or more predetermined surface characteristics of a determined feature and
the step of allocating a weight and/or recognizing a feature as a static feature comprises comparing the surface characteristics of the determined feature to predetermined surface characteristics and allocating the weight or recognizing the determined feature as a static feature if the comparison identifies a match.

As mentioned, the surface characteristics may have to do with the structure or shape of the surface, such as a coarseness, smoothness, reflection, shape (angles between plane surfaces, for example) curvature and the like. Alternatively, the surface characteristics may have to do with color, fluorescence, emission, reflection, scattering or the like. Further alternatively, the surface characteristics may have to do with information provided on the surface, such as a bar code, text, numbers or the like.

Then, as is also described above, the recognizing step could comprise:
categorizing at least one feature into a first category of the plurality of categories,
allocating a predetermined weight and/or recognizing a feature as a static feature if information is available, relating to the first category, reflecting that features of the first category are static features.

Another aspect of the invention relates to a navigation system for navigating a robot unit, comprising one or more remote sensors, in a scene or venue, the scene/venue comprising a number of features, the system comprising a controller configured to:
receive an output from the sensor(s),
determine, from the output, a plurality of features,
determine a position of each determined feature,
allocate a weight to each recognized feature which:
emits or reflects an amount of radiation exceeding a predetermined minimum intensity, or
emits or reflects radiation at a predetermined wavelength and.
determine a position of the robot unit vis-à-vis the position(s) of the determined feature(s) based on the weight allocated to the feature(s).

This aspect also relates to a method of operating a navigation system for navigating a robot unit in a scene or venue, the scene/venue comprising a number of static features and a number of dynamic features, each feature being configured to:
emit or reflect an amount of radiation exceeding a predetermined minimum intensity, or
emit or reflect radiation at a predetermined wavelength.
the method comprising:
one or more remote sensors of the robot unit outputting information representing surroundings of the robot unit and radiation received from the features,
determining, from the information, a plurality of features and positions thereof, allocating a predetermined weight to features based on the amount or wavelength of radiation emitted/reflected by the feature and determining a position of the robot unit vis-à-vis the recognized static feature(s) based on the weight allocated to the pertaining recognized feature(s).

Manners of determining the radiation and the like are described further above.

Another aspect of the invention relates to a navigation system for navigating a robot unit, comprising one or more remote sensors, in a scene or venue, the scene/venue comprising a number of features, the system comprising a controller configured to:

receive an output from the sensor(s), determine, from the output, a plurality of features, and determine a position of each determined feature, determine from the output, information representing a visible characteristic of each feature and allocate a weight to features with one or more of a plurality of predetermined visible characteristics and determine a position of the robot unit vis-à-vis the position(s) of the determined feature(s) based on the weight allocated to the feature(s).

That aspect also relates to a method of operating a navigation system for navigating a robot unit in a scene or venue, the scene/venue comprising a number of static features and a number of dynamic features, the method comprising:

one or more remote sensors of the robot unit outputting information representing surroundings of the robot unit, the information comprising information representing a visible characteristic of each feature, determining, from the information, a plurality of features and positions thereof, allocating a predetermined weight to features with one of a plurality of predetermined visible characteristics and determining a position of the robot unit vis-à-vis the recognized static feature(s) based on the weight allocated to the pertaining recognized feature(s).

Further above, such characteristics are described together with how to determine these.

To allow for updating and the addition of new characteristics, this method may further comprise the steps of:

the sensor(s) outputting information representing a new visible characteristics of a feature, receipt of information relating to a weight of the feature and including the new visible characteristic to the plurality of predetermined visible characteristics.

Yet another aspect of the invention relates to a navigation system for navigating a robot unit, comprising one or more remote sensors, in a scene or venue, the scene/venue comprising a number of features, the system comprising a controller configured to:

receive an output from the sensor(s), determine, from the output, a plurality of features and a position of each determined feature, determine from the output, one or more predetermined surface characteristics of a determined feature and compare the surface characteristics of the determined feature to predetermined surface characteristics and allocate a predetermined weight to the determined feature if the comparison identifies a match and determine a position of the robot unit vis-à-vis the position(s) of the determined feature(s) based on the weight allocated to the feature(s).

The surface characteristics and how to determine these may be seen further above, or may be detected by learned models, such as Convolutional Neural Networks or the like, or may be computed directly from sensor data, such as by mathematical operations, such as computation of feature descriptor vectors, such as SIFT or SURF feature vectors.

This aspect relates to a method of operating a navigation system for navigating a robot unit in a scene or venue, the scene/venue comprising a number of static features and a number of dynamic features, the method comprising:

one or more remote sensors of the robot unit outputting information representing surroundings of the robot unit, determining, from the information, a plurality of features and positions thereof, the one or more remote sensors of the robot unit detecting one or more predetermined surface characteristics of a determined feature and allocating a weight to a feature based on a comparison between the surface characteristics of the determined feature and predetermined surface characteristics and determining a position of the robot unit vis-à-vis the recognized static feature(s) based on the weight allocated to the pertaining recognized feature(s).

Yet another aspect of the invention relates to a navigation system for navigating a robot unit, comprising one or more remote sensors, in a scene or venue, the scene/venue comprising a number of features, the system comprising a controller and a storage available to the controller and in which information is stored relating to each category of a plurality of feature categories, wherein the controller is configured to:

receive an output from the sensor(s), determine, from the output, a plurality of features and a position of each determined feature, categorize a feature into a first category of the plurality of categories, compare the first category to information of the storage and allocate a predetermined weight to the determined feature based on the comparison and determine a position of the robot unit vis-à-vis the position(s) of the determined feature(s) based on the weight allocated to the feature(s).

The categories and the manners of determining these are described further above.

This aspect relates to a method of operating a navigation system for navigating a robot unit in a scene or venue, the scene/venue comprising a number of static features and a number of dynamic features, the method comprising:

one or more remote sensors of the robot unit outputting information representing surroundings of the robot unit, determining, from the information, a plurality of features and positions thereof, based on the information output, categorizing at least one feature into a first category of the plurality of categories, allocating a predetermined weight to a determined feature if information is available, relating to the first category, reflecting that features of the first category are static features and determining a position of the robot unit vis-à-vis the recognized static feature(s) based on the weight allocated to the pertaining recognized feature(s).

Naturally, any and all features and all embodiments may be combined if desired. The providing of the weight based on multiple parameters may make the process even more precise.

Another aspect of the invention relates to a navigation system for navigating a robot unit, comprising one or more remote sensors, in a scene or venue, the scene/venue comprising a number of static features and a number of dynamic features, the system comprising a controller configured to:
  receive an output from the sensor(s),
  a plurality of times:
  determining, from the output, an occupancy of each of a plurality of positions in the scene/venue,
  storing the occupancies determined, and
  determining, for each of the plurality of positions, a predicted occupancy of each position in the scene/venue from the stored occupancies and
  determining a position of the robot unit in the scene or venue based on positions having a predicted occupancy above a predetermined minimum occupancy.

Naturally, the aspects, embodiments, situations and other information mentioned in relation to the previous aspects of the invention may be equally relevant in relation to the present aspect of the invention.

Thus, the scene or venue may be as described above as may the features. Again, the features in the scene or venue may be completely static, as walls and pillars, very dynamic, such as chairs, pallets and luggage, and more or less static, such as storage racks, tables and the like.

The robot unit, the sensors and the like may be as described above.

The scene or venue, even though still having the features, may be divided into positions. The positions may be defined as a grid or matrix of predetermined positions, or in any other desired manner. Positions may be defined with any desired distance there between, such as 10 cm, 5 cm, 1 cm or less if desired.

A position usually will represent not only a mathematical position of the scene/venue but an area, such as an area extending from the position toward adjacent positions, such as half the distance to adjacent positions.

Positions need not be defined in relation to the scene or venue. When the occupancies have been determined multiple times, overlap may be determined where occupied positions determined at different times overlap. Some occupied positions may not overlap, as dynamic features may occupy one position at one point in time but not the next point in time, whereas more static features will occupy the same positions multiple points in time, so that an overlap may be determined.

The occupancies for each time or point in time or period of time may be represented as a map, as described above. The maps may then be overlaid so that the largest overlap of occupied positions is seen.

From this, an extent of a feature or occupied area in the scene/venue may be determined. Thus, even though a former occupancy determination has not been made for a particular position, that position may be determined vis-à-vis the occupied areas, so that the positions actually determined at individual points in time may be compared.

When multiple such maps or occupancy information is provided, information may be derived over time of the frequency or probability of occupancy of a position. If a position is frequently or always occupied, a corresponding predicted occupancy may be determined. If a position is never or rarely occupied, a corresponding predicted occupancy may be determined. Thus, the predicted occupancies relate to the combined knowledge of the occupancies determined the plurality of times.

Then, instead of determining the features, the sensors may determine the presence of the features, and thus the occupancy thereof.

Clearly, the plurality of times may be any number of times. Each "time" may be a separate operation of the robot unit, such as a cleaning routine, inspecting routine or the like. When the robot moves about in the scene/venue, it may operate its sensors and provide/determine the occupancy of the positions. 1, 2, 3, 5, 10, 20, 30, 40, 50 or more seconds, minutes, hours or days may pass between "times". This occupancy may then be combined with occupancy information from earlier operations so that the predicted occupancy information is updated.

In order to stay updated, the "plurality of number of times" may be the last X number of times, so that the occupancies of earlier times are no longer used in the predictions. In this manner, the predicted occupancies relate to the latest "runs" so that historic data is allowed to exit the procedure. In this advantage even the moving of usually static features, which would make the former and new positions partially occupied, will over time have the former position predicted as not occupied and the new position as firmly occupied.

The occupancies determined may be stored in the form of maps or any other manner. The occupancies may be stored in a storage in the robot unit or in a more remote storage. Occupancies may be stored for a predetermined period of time or a predetermined number of times (maps) may be stored and used in the determination of the estimated occupancies.

An occupancy may represent a probability that the position is occupied by a feature or an obstacle. Other types of maps or representations, such as Truncated, Signed Distance Field (TSDF) may be used. Such values may be determined in standard robot navigation, as is described further below, as sensors will normally output a signal from which occupancy may be estimated but not always with 100% certainty. An occupancy may be a binary piece of information or may take into account the fact that a position may be occupied some of the time but not all of the time. Thus, an occupancy may relate to the number of times, the frequency, or the percentage of the time at which the position is occupied. Occupancy may thus be selected as a number within a predetermined interval, such as from 0 to 100.

In one embodiment, a predicted occupancy of a position is determined based on the occupancies determined for the pertaining position. Thus, as described, the predicted occupancy may be determined based on the information gathered over time.

The occupancies are then used in the determination of the position of the robot, such as in relation to features or positions in the scene or venue. Clearly, if an occupancy is high, that position is more trustworthy than a position with a medium occupancy. Thus, a map may be provided with features expected in the scene or venue and this may be compared to the occupancies. When a fit is seen, the position of the robot may be determined. In this comparison, it may be desired to use only positions with occupancies above a threshold value.

Another aspect of the invention relates to a method of navigating a robot unit, comprising one or more remote sensors, in a scene or venue, the scene/venue comprising a number of static features and a number of dynamic features, the system comprising a controller configured to:
  receive an output from the sensor(s),
  a plurality of times:

determining, from the output, an occupancy of each of a plurality of positions in the scene/venue, storing the occupancies determined, and determining, based on the stored occupancies, for each of the plurality of positions, a predicted occupancy of each position in the scene/venue from the stored occupancies and determining a position of the robot unit in the scene or venue based on positions having a predicted occupancy above a predetermined minimum occupancy.

The robot unit or navigation system may thus determine the occupancy a number of times, such as during each of a plurality of distinct operations over time in the scene/venue and where the steps of determining the occupancies and storing the occupancies are performed for each distinct operation.

The occupancy information, such as in the form of a number of maps each generated for each distinct operation, may be gathered and used for generating the predicted occupancy which may be an updated map.

Thus, the robot unit may navigate the scene/venue using the latest predicted occupancies while the sensor(s) output information and occupancies are determined. After that, or even during the operation, updated predicted occupancies may be determined and the navigation of the robot based thereon.

The robot navigation may be performed as usual by using the detectors to determine relative positions of features or obstacles in the vicinity of the robot where the position of the robot in the scene/venue may then be determined based on a map describing the positions of the features/obstacles in the scene/venue. Then, the robot may determine how to move in the scene/venue while generating new position determinations and thus continuous determinations of the robot's position.

Embodiments of the present disclosure provide an improved robotic mapping system and method configured to enable identification of detected objects, features and/or structures within an operating environment as likely or having a higher probability of being a "static feature" (e.g., objects, features and/or structures that are immovable or otherwise generally not typically moved in position within the operating environment) or likely or having a higher probability of being a "dynamic feature" (e.g., objects, features and/or structures that are likely to move within the operating environment, particularly over the span of two or more navigations within the operating environment). As a result, machines on which the improved robotic mapping system is operably coupled can place a navigational emphasis on static features as the machines begin to recognize their surroundings. By contrast, detected objects, features and/or structures determined to be dynamic features can be recognized as likely representing a temporary obstacle, which may or may not be in the same location at a later time, so as not to potentially confuse the machine while it is determining its position and navigating within the operating environment.

Computer vision can be applied in the discipline of robotic mapping. The goal for an autonomous robot is to be able to construct a map/floor plan of an operating environment, and to localize itself for navigation within the operating environment. Autonomous navigation often utilizes simultaneous localization and mapping (SLAM), which involves constructing or updating a map of an unknown environment while simultaneously keeping track of the machine's location within the environment. In that regard, the machine can be guided or influenced by a navigation module based, at least in part, upon data related to distance measurements acquired by an optical assembly (e.g., a LiDAR, 2-D camera, 3-D/stereo camera, etc.).

In some embodiments, localization can be based upon a creation of a multiplicity of data points, which collectively form a representation of the operating environment. Each discrete data point can represent a node in a data structure and can include data related to an estimation of the current position of the machine. In some embodiments, the machine can utilize the data points to formulate a respective version of a map of the operating environment. Representation of such maps may, for example, be in the form of a grid delineating boundaries or otherwise describing features of the operating environment, such as an occupancy grid or a Truncated Signed Distance Field (TSDF) map.

As the machine traverses the operating environment, motion of the machine can be measured with an odometer, inertial measurement unit, GPS or other instrument. Each respective data point can then be updated with actual information based upon the known rotation of wheels. With respect to traversing the operating environment, additional distance sensor readings (e.g., acquired by one or more optical assemblies) can be used to update the map, as well as to increment or decrement a data point weight, relevance score, or some other factor representing an estimated likelihood of the detected object to which the data point belongs as being either of a static feature or a dynamic feature.

Maps can be two-dimensional or three-dimensional. Two-dimensional maps can be generated based on the scene or venue at a predetermined height (e.g., 10-30 cm from a floor or bottom, 20 cm from a floor or bottom, etc.). Alternatively, a two-dimensional map can be formed by projecting the obstacles to a predetermined, often horizontal, plane. Three-dimensional maps can take into account the different shapes of obstacles and the robot, as a robot may reach or impact on an obstacle at one height while not at another height. Thus, if the map is generated at "another" height, the robot could impact on the obstacle even when a two-dimensional map would indicate that there is still space between the obstacle and the robot.

In some embodiments, a map can represent an illustration of the boundaries of all obstacles, features and/or landmarks within a given scene/venue projected on to a horizontal surface. Maps often are illustrated in a scaled-down version if displayed, for example, to an operator. Different types of maps exist, such as occupancy grids and truncated signed distance fields (TSDFs). In an occupancy grid, the space is divided into a grid of map cells, where each cell contains an estimate of the probability that that cell is occupied by a landmark or feature. Thus, the map may be represented by a number of map cells each representing a probability of there being a landmark or feature within that cell. Often this probability is represented as a number of between 0 and 1.

A TSDF is like an occupancy grid, but here each cell contains the distance to the nearest landmark or feature, if there is a landmark or feature within some truncation distance. This map may be represented with distance measures for each cell or more simply as a color indicating distances (e.g. green indicating a large distance to red indicating no distance).

Other types of maps are also contemplated. One embodiment of the present disclosure provides an indoor mobile industrial robot system configured to classify a detected object within an operating environment as being either one of a static feature or a dynamic feature. Classification of a detected object can occur locally (e.g., via an onboard computer) or remotely (e.g., in the cloud). The indoor mobile industrial robot system can include a mobile robotic platform, a LiDAR unit, positional module, and processor. The mobile robotic platform can be configured to self-navigate within an operating environment. The LiDAR unit can be operably coupled to the mobile robotic platform and configured to emit light energy and receive reflected light energy from the detected object. The positional module can be configured to account for at least one of a position and/or rotation angle of the LiDAR unit with respect to the mobile robotic platform. The processor can be configured to translate the received reflected light energy and information from the positional module into a set of data points representing the detected object having at least one of Cartesian and/or polar coordinates, and an intensity, wherein if any discrete data point within the set of data points representing the detected object has an intensity at or above a defined threshold the entire set of data points is classified representing a static feature, otherwise such set of data points is classified as representing a dynamic feature.

In one embodiment, the defined threshold can be a receipt of at least 70% of the emitted light energy from the LiDAR unit. In one embodiment, the LiDAR unit can be configured to at least one of emit a continuous beacon of light energy or emit discrete pulses of light energy. In one embodiment, the LiDAR unit can be configured to rotate with respect to the mobile robotic platform.

In one embodiment, the system can further include a navigation module, including one or more sensors configured to sense a positional movement of the robotic platform within the operating environment (e.g., wheel encoder, wheel direction sensor, etc.) configured to account for navigational movements of the mobile robotic platform within the operating environment. In one embodiment, the system can further include a memory configured to store the set of data points. In one embodiment, the processor can be configured to utilize the set of data points to provide an estimation of a shape of the detected object. In one embodiment, the processor can further be configured to produce a map of the operating environment, including relative positions of any detected static features and/or dynamic features within the operating environment, as well as the position of the robotic platform within the operating environment. In one embodiment, the system can further include one or more proximity sensors configured to detect a proximity of the mobile robotic platform to obstacles within the operating environment.

Another embodiment of the present disclosure provides an active light-based sensor device configured to classify a detected object within an operating environment as being either one of a static feature or a dynamic feature. The device can include a LiDAR unit, positional module, and processor. The LiDAR unit can be configured to emit light energy and to receive reflected light energy from the detected object. The positional module can be configured to account for at least one of a position and/or rotation angle of the LiDAR unit within the operating environment. The processor can be configured to translate the received reflected light energy and information from the positional module into a set of data points representing the detected object having at least one of Cartesian and/or polar coordinates, and an intensity, wherein if any discrete data point within the set of data points representing the detected object has an intensity at or above a defined threshold the entire set of data points is classified representing a static feature, otherwise such set of data points is classified as representing a dynamic feature.

Another embodiment of the present disclosure provides a method of classifying a detected object within an operating environment as being either one of a static feature or a dynamic feature, including: identifying one or more static feature within an operating environment; applying a reflective material to the identified static feature; emitting a light energy from a light-based sensor device towards the static feature; receiving reflected light energy from the static feature; and translating the received reflected light energy into a set of data points representing a detected object having at least one of Cartesian and/or polar coordinates, and an intensity, wherein if any discrete data point within the set of data points representing the detected object has an intensity at or above a defined threshold indicating the presence of a reflective material the entire set of data points is classified representing a static feature, otherwise such set of data points is classified as representing a dynamic feature. In some embodiments, the reflective material can be at least one of a sticker, tape, emblem, paint, or the like configured to reflect at least 50% of the light energy directed at it.

Another embodiment of the present disclosure provides an indoor mobile industrial robot system configured to iteratively classify a detected object within an operating environment as being either one of a static feature or a dynamic feature based on a continued detected presence (or absence) of the detected object within the operating environment. The system can include a mobile robotic platform, optical assembly, positional module, and processor. The mobile robotic platform can be configured to self-navigate within an operating environment. The optical assembly can be operably coupled to the mobile robotic platform and configured to receive images of the operating environment. The positional module is configured to account for at least one of a position and/or rotation angle of the optical assembly with respect to the mobile robotic platform. The processor is configured to translate the received images and information from the positional module into a multidimensional (e.g., two dimensions or more) map of the operating environment, wherein the map is divided into a plurality of cells, each of the cells assigned an estimated probability that the cell is occupied by a detected object, and wherein the estimated probability assigned to the cell is iteratively updated to account for a continued presence (or absence) of the detected object within the operating environment in a subsequent self-navigation through the operating environment.

In one embodiment, the optical assembly can include a left camera and a right camera separated from one another by a fixed distance. In one embodiment, the distances to detected objects within the operating environment can be determined by way of binocular disparity. In one embodiment, the optical assembly can be one or more of a LiDAR unit, 2-D optical assembly and/or 3-D optical assembly with range finding capabilities. In one embodiment, the optical assembly is configured to rotate with respect to the mobile robotic platform. In one embodiment, the navigation module can be configured to account for navigational movements of the mobile robotic platform within the operating environment.

In one embodiment, the processor can be further configured to designate individual cells among the plurality of cells of one or more grids as one of being occupied by a detected object, being unoccupied, or not being within the line of sight of the optical assembly. In one embodiment, the individual cells designated as being occupied by a detected object are assigned a first initial probability, and individual cells designated as being unoccupied are assigned second initial probability, wherein the second initial probability is lower than the first initial probability, thereby indicating that an object later detected in the operating environment corresponding to the individual cells designated as being unoccupied is more likely to be a dynamic feature and/or an estimated distance to a detected feature. In one embodiment, the processor can be configured to assign initial probabilities to individual cells previously being designated as not being within the line of sight of the optical assembly upon receiving images of a portion of the operating environment corresponding to the individual cells previously being designated as not being within the line of sight of the camera. In one embodiment, a first grid captures featured deemed static, while a second grid captures features deemed dynamic.

Another embodiment of the present disclosure provides a vision system configured to iteratively classify a detected object within an operating environment as being either one of a static feature or a dynamic feature based on perceived movement (and/or non-movement) of the detected object within the operating environment. The system can include an optical assembly, positional module, and processor. The optical assembly can be configured to receive images of the operating environment. The positional module can be configured to account for at least one of a position and/or rotation angle of the optical assembly within the operating environment. The processor can be configured to translate the received images and information from the positional module into a multidimensional understanding of the operating environment, wherein the operating environment is divided into a plurality of cells, and objects detected within the operating environment are associated with one or more cells of the plurality of cells, wherein an initial probability of the detected object being a static feature is assigned to the one or more cells, and wherein the probability assigned to the one or more cells is iteratively updated upon receipt of subsequent images from the optical assembly to account for at least one of movement and or non-movement of the detected object within the operating environment.

Another embodiment of the present disclosure provides a method of classifying a detected object within an operating environment as being either one of a static feature or a dynamic feature based on at least one of a perceived movement and/or non-movement of the detected object within the operating environment, including: receiving an initial image of an operating environment; translating the received images into a multidimensional understanding of the operating environment, wherein the operating environment is divided into a plurality of cells, and objects detected within the operating environment are associated with one or more cells of the plurality of cells, wherein an initial probability of the detected object being a static feature is assigned to the one or more cells; receiving a subsequent image of the operating environment; and updating the initial probability assigned to the one or more cells based on at least one of a movement and/or non-movement of the detected object within the operating environment.

Another embodiment of the present disclosure provides an indoor mobile industrial robot system configured to recognize and classify a detected object within an operating environment as being either one of a static feature or a dynamic feature. In some embodiments, in certain aspects of the process (e.g., initial recognition and classification) can be performed manually. The system can include a mobile robotic platform, optical unit (e.g., 2-D optical assembly, 3-D optical assembly, LiDAR, etc.) and a processor. The mobile robotic platform can be configured to self-navigate within an operating environment. The camera unit can be operably coupled to the mobile robotic platform and configured to receive an image of a detected object. The processor can be configured to perform a deep learning algorithm including an input layer, at least one hidden layer, and an output layer, each of the layers including a plurality of neurons having a bias value, each of the neurons of the input layer connected to neurons in the at least one hidden layer, and each of the neurons in the at least one hidden layer connected to neurons in the output layer, each of the connections between the neurons having a weight value, wherein images from the camera unit are fed into the input layer, and through an iterative process the bias values of each of the neurons and the weight value of each of the connections are tuned to produce a desired output of the output layer, the output layer indicating the probability that the detected object of the camera unit image is one of a static feature and/or a dynamic feature.

In one embodiment, the desired output of the output layer can be defined according to training data representing objects within the operating environment known to be one of a dynamic feature or a static feature. In one embodiment, the bias values of each of the neurons and the weight value of each of the connections can be tuned to minimize a cost function, representing a deviation between an actual output of the output layer and a desired output of the output layer. In one embodiment, the training data can be supplied by at least one of an active light-based sensor device configured to classify a detected object within an operating environment as being either one of a static feature or a dynamic feature and/or a vision system configured to iteratively classify a detected object within an operating environment as being either one of a static feature or a dynamic feature based on perceived movement (and/or non-movement) of the detected object within the operating environment. In some embodiment, the training data can be divided into a set of implemented objects having characteristics of static features and a set of implemented objects having characteristics of dynamic features. In one embodiment, individual pixels of a digital image received by the camera unit can be utilized as discrete inputs for neurons of the input layer. In one embodiment, each of the neurons of the input layer can be at least one of fully connected to neurons of the at least one hidden layer or distinct groups of neurons of the input layer connect to a single neuron of the at least one hidden layer with a shared weight value. In one embodiment, an output of each of the neurons can be computed according to at least one of a linear function, sigmoid function, tan h function, or rectified linear unit function.

Another embodiment of the present disclosure provides an automatic object recognition system configured to classify a detected object within an operating environment as being either one of a static feature or a dynamic feature. The system can include a camera unit and a processor. The camera unit can be configured to receive an image of a detected object. In embodiments where the image is captured from various optical sources (e.g., a 2-D camera and LiDAR), data gathered from the camera unit can be fused together to represent a single captured image. The processor can be configured to perform a deep learning algorithm including an input layer, at least one hidden layer, and an output layer, each of the layers including a plurality of neurons having a bias value, each of the neurons of the input layer connected to neurons in the at least one hidden layer, and each of the neurons in the at least one hidden layer connected to neurons in the output layer, each of the connections between the neurons having a weight value, wherein images from the camera unit are fed into the input layer, and through an iterative process the bias values of each of the neurons and the weight value of each of the connections are tuned to produce a desired output of the output layer, the output layer indicating the probability that the detected object of the camera unit image is one of a static feature and/or a dynamic feature.

Another embodiment of the present disclosure provides a method of automatic object recognition configured to classify a detected object within an operating environment as being either one of a static feature or a dynamic feature, including: receiving an image of a detected object via a camera unit; and performing a deep learning algorithm including an input layer, at least one hidden layer, and an output layer, each of the layers including a plurality of neurons having a bias value, each of the neurons of the input layer connected to neurons in the at least one hidden layer, and each of the neurons in the at least one hidden layer connected to neurons in the output layer, each of the connections between the neurons having a weight value, wherein images from the camera unit are fed into the input layer, and through an iterative process the bias values of each of the neurons and the weight value of each of the connections are tuned to produce a desired output of the output layer, the output layer indicating the probability that the detected object of the camera unit image is one of a static feature and/or a dynamic feature.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

Figure 1:
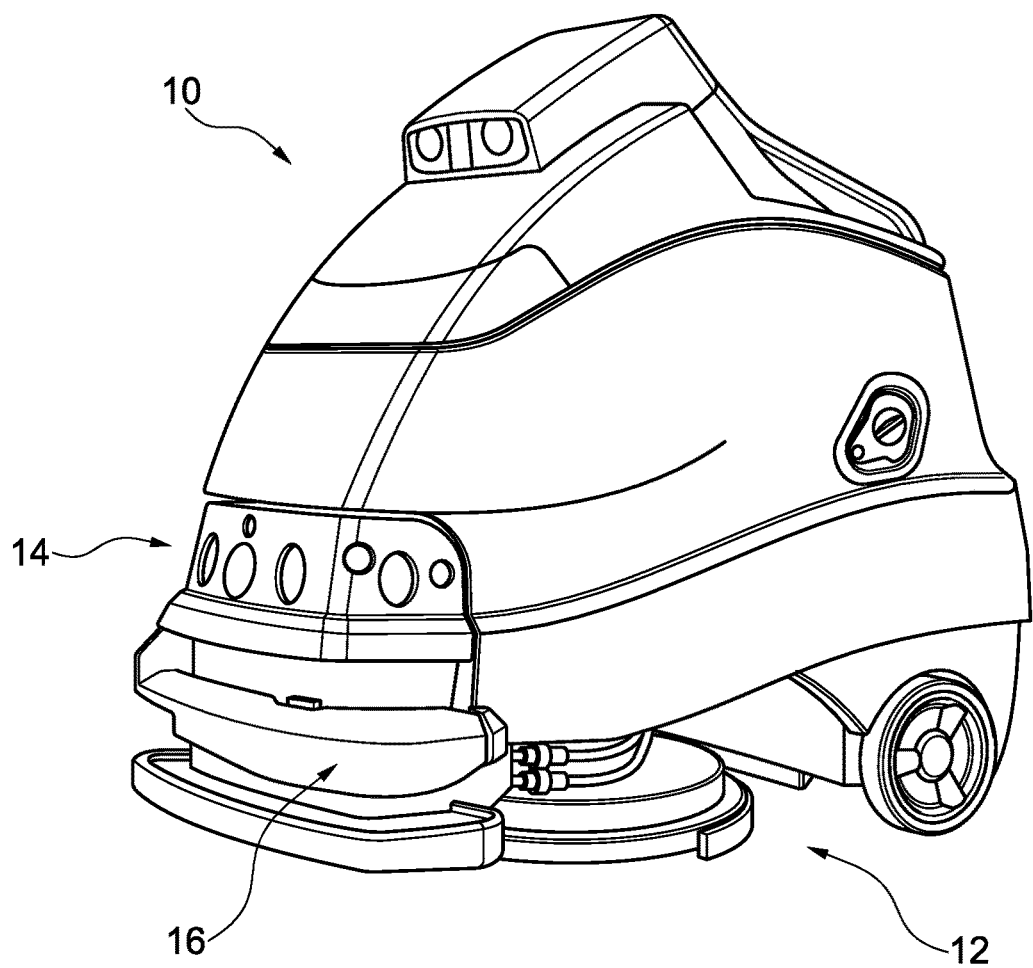
FIG. 1 is a perspective view depicting a mobile industrial robot system, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIG. 1, a perspective view of an mobile industrial robot system 10 having one or more optical assemblies 14 and 16 (e.g., a LiDAR, 2-D camera, 3-D/stereo camera, etc.) configured to detect and classify objects within an operating environment as either being a "static feature" or a "dynamic feature," is depicted in accordance with an embodiment of the disclosure.

Figure 7:
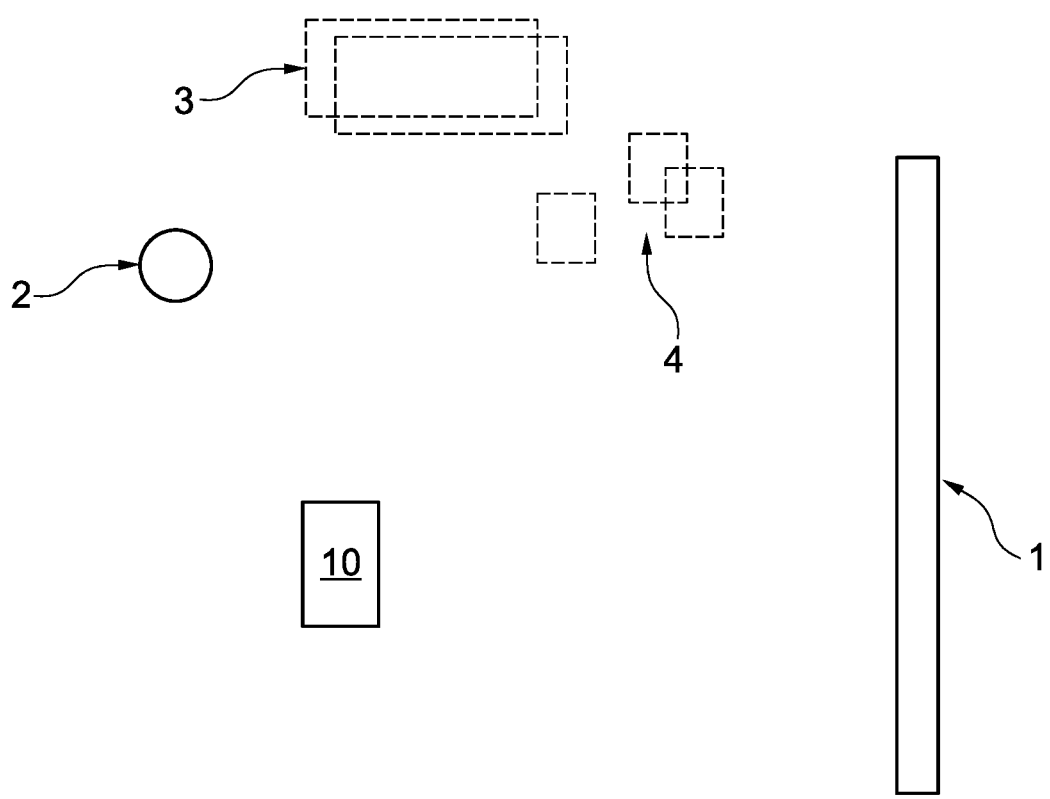
FIG. 7 is an overall review of a scene or venue in which the robot system may navigate.

FIG. 7 illustrates a scene or venue having therein the robot system 10 and a number of features or obstacles comprising a wall 1, a pillar 2, a table 3 and a chair 4. The wall 1 and pillar 2 are stationary, whereas the table 3 may sometimes be slightly displaced (thus the two hatched outlines) and the chair 4 is often in different positions (thus multiple hatched outlines)

Examples of static features can include fixed structures such as columns, walls, buildings, bridges, etc., as well as typically stationary equipment, such as semi-permanent walls, shelving, fire-extinguishers, safety equipment, etc. Static features might also relate to surface characteristics of these static structures, as discussed above. Dynamic features (also referred to as "dynamic objects" or "dynamic entities" refer to objects, features and/or structures that may move within the operating environment, particularly over the span of two or more navigations within the operating environment. Examples of dynamic features can include objects such as furniture, crates, etc.

When navigating in the space, the robot system 10 will determine its position in the space from its relative position vis-à-vis the features. Now, the robot will preferably rely more on, or solely on, the static features, as the robot's position, in the space, determined in relation to static features is more certain. Determining a position, in the space, of the robot vis-à-vis a dynamic feature such as the chair will give a less precise certain determination, as the position of the chair, in the space, is not constant.

The robot will usually, however, determine or detect all obstacles or features in its vicinity, so it is desired to be able to determine which features are static, and perhaps to which degree these are static, and which are dynamic and thus perhaps are not to be used—or on which less emphasis may be put, when determining the position of the robot and/or navigating in the space.

Naturally, determination or detection of also the dynamic features may be desired, not the least to prevent the robot from colliding therewith.

In the following, features are predominantly denoted static or dynamic. It is clear that a weight may be allocated to a feature as to its staticness, i.e. how often the feature is in the same position or how probable it is that the feature will be in that position.

A feature may be determined to be static in a number of manners, some of which are described further below. In one manner, the static features are visibly marked in a manner so that a detection system may distinguish between marked features and un-marked features. In another manner, the staticness of a feature may be determined from the position of the feature as determined over time, such as for each pass of the robot at the feature. If the feature is in the same position each time, the feature may be assumed to be static. However, the more often the feature is positioned in new positions, the more dynamic may the feature be determined to be. In yet another manner, features may be classified or categorized, where each class of features may be correlated with a degree of staticness or dynamic behavior. Thus, features in the classes of chair, bicycle, person, luggage, for example, may be seen as dynamic, whereas features in the classes of wall, pillar, staircase, storage rack or the like may be seen as static. A feature may be determined to belong to a given class based on e.g. an image of the feature as provided by a camera of the robot.

In one embodiment, the indoor mobile industrial robot system 10 can include a mobile robotic platform 12 configured to clean, treat, scrub or polish a floor surface or perform other similar actions using, for example, a trailing mop system, scrubber and/or squeegee. Other mobile robotic platform 12 applications include social interacting and guiding robots (e.g., airports, stock-keeping and monitoring for warehouses and supermarkets), detecting and cleaning contaminated surfaces, moving goods, etc. In some embodiments, an operator can stand on the mobile robotic platform and control the system 10 using a steering wheel. Alternatively, the one or more optical assemblies 12A/B, 14A/B, 16, can enable the system 10 to autonomously drive itself. The present disclosure describes various features that enable detection of objects, and classification of the objects as being one of either a dynamic feature or a static feature for improved navigation within an operating environment. Although the features described in the present application may be utilized in connection with industrial robotic systems, other applications of the static and dynamic feature classification systems and methods are contemplated. For example, static and dynamic feature classification systems and methods may be used on other types of user driven, semi-autonomous, and autonomous vehicles, or may be used as a standalone system (e.g., independent from any form of a mobile platform) for gathering information about an operating environment.

Successful weight allocation and/or identification of static and dynamic features play an important role in enabling successful navigation in both manual and autonomous modes. Static features can serve as landmarks to estimate ego-motion within the operating environment. Proper identification of objects as static features creates a more robust localization. More robust localization in turn, improves the accuracy of any new map entries. Accordingly, knowledge of dynamic features inhibits pollution of maps and enables embodiments of the present disclosure to make more informed decisions about the operating environment, thereby enabling safer, more efficient and elegant operation within the operating environment.

Embodiments of the present disclosure can use the various systems and methods to classify detected objects as being either a static feature or a dynamic feature. Such systems and methods can include, for example, the use of retro-reflectors, trained models, and automatic object recognition as aids in properly classifying features as being either static or dynamic. Although such systems and methods are described herein as being distinct (e.g., standalone), such systems and methods, in whole or in part, may be optionally combined for improved classification.

In some embodiments, operating environments in which embodiments of the present disclosure are intended to operate can be augmented with retro-reflectors applied to known static features (as e.g. identified by a user). Retro-reflector markers can include highly reflective materials configured to direct a large portion of received light energy back to its source. Accordingly, navigation systems including active light-based sensors will generally receive a distinctly stronger signal upon interaction with retro-reflective markers, thereby improving the positive identification of static features.

In one embodiment, the operator identifies static features within the operating environment, and applies retro-reflective markers to surfaces of the static features, such as at an appropriate height. Thereafter, while operating within the operating environment, one or more active light-based sensors of the robot can be used to determine distances of objects relative to embodiments of the present disclosure, as an aid in navigation within the operating environment. Groups of data including distinctive signals corresponding to returns from retro-reflectors can be classified as static features within the operating environment. All other groups of data collected by the light-based sensors can be classified as dynamic features.

Figure 2:
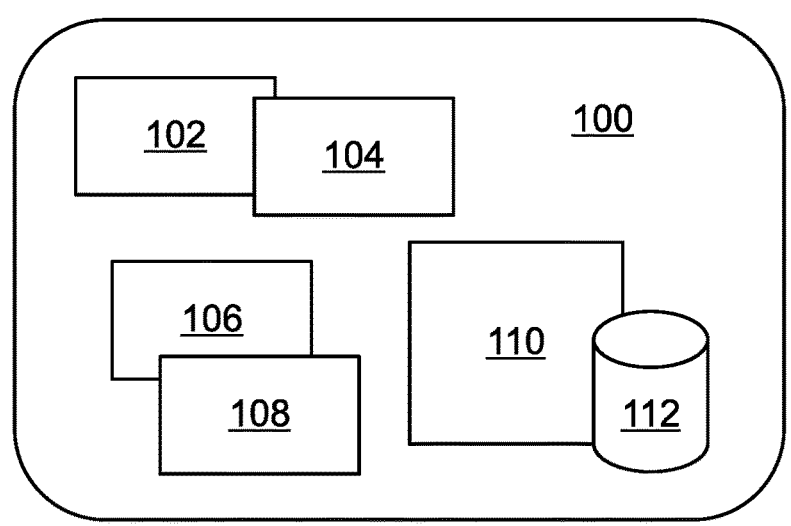
FIG. 2 is a system architecture diagram depicting a light detection and ranging (LiDAR) unit, in accordance with an embodiment of the disclosure.

With reference to FIG. 2, in some embodiments, the active light-based sensor can include a light detection and ranging (LiDAR) unit 100 configured to detect both a distance and returned light intensity from objects within the operating environment, which in combination with positional information of the unit 100 can enable the collection of a dataset useful in constructing a multidimensional understanding of the distances of surrounding objects. In some embodiments, the dataset can include an x- and y-component or a relative distance and angle according to a polar coordinate system, for example, where the LiDAR unit is configured as a rotating beacon emitting a continuous source or pulses of light energy along a plane at a given distance from the floor (e.g., 8 inches above the ground). In some embodiments, the dataset can include a limited z-component, where the LiDAR unit is configured to additionally operate within a vertically oriented band, perpendicular to the floor. Such an understanding of the distances of surrounding objects is useful in mapping the operating environment for navigational purposes. In some embodiments, the LiDAR unit 100 can further be combined with other navigational and obstacle avoidance aids, such as one or more proximity sensors (e.g., a 3-D camera, or the like) configured to detect when embodiments of the present disclosure are in close proximity to an object within the operating environment, and/or is at risk of inadvertently impacting the object.

In some embodiments, the LiDAR unit 100 can include a laser unit 102, optical receiver 104, navigation module 106, positional module 108, and processor/database 110/112. The laser unit 102 can be configured to emit a light energy, for example in the form of a burst (e.g., a pulse) or continuous beacon as the unit 100 rotates with respect to the operating environment. In one embodiment, the emitted light energy can have a wavelength of approximately 1064 nm; although other wavelengths are also contemplated. The optical receiver 104 can be configured to detect light energy emitted by the laser unit 102 that is reflected back to the LiDAR unit 100 by the surrounding objects. In some cases, multiple returns corresponding to different surfaces of the objects can be received by the optical receiver 104.

The navigation module 106 can be configured to account for navigation of the navigational vehicle on which the LiDAR unit 100 is mounted within the operating environment, while the positional module 108 can be configured to account for rotation and/or other orientation factors of the LiDAR unit 100 relative to the navigational vehicle. The processor 110 can be configured to calculate distances to the surrounding objects based on the travel time of the emitted light and reflected return energy.

Frequently, emitted light may reflect off several different surfaces of a surrounding object, thereby indicating structural components and/or dimensional complexity of the object. The amount of energy received by the optical receiver 104 can be referred to as the "intensity." The areas where more photons or more light energy returns to the receiver 104 create peaks in a distribution (e.g., waveform curve) of the received energy. In some embodiments, these peaks in the waveform can be considered to represent surfaces in which the light energy has reflected. Accordingly, identifying multiple peaks representing different reflective surfaces associated with the object, can provide an estimation of the shape of the object.

In some embodiments, the processor 110 can be configured to translate the received light energy reflections into a collection of discrete points corresponding to the return peaks in the waveform curve. The collection of discrete return LiDAR points can be referred to as a LiDAR point cloud, which may in some embodiments include Cartesian and/or polar coordinate location values. Additionally, each of the discrete points may have an intensity value, representing the amount of light energy recorded by the receiver 104. The data can be stored by the memory 112.

Accordingly, where the amount of light energy recorded by the receiver 104 indicates the presence of a retro-reflector, the dataset associated with that object or feature can be classified as a static feature, thereby indicating that the object may be considered as a reliable navigational aid in future operations within the operating environment. All other datasets associated with other objects can be classified as dynamic features, thereby indicating that said objects have a likelihood of being moved within the operating environment between subsequent operations.

Figure 3:
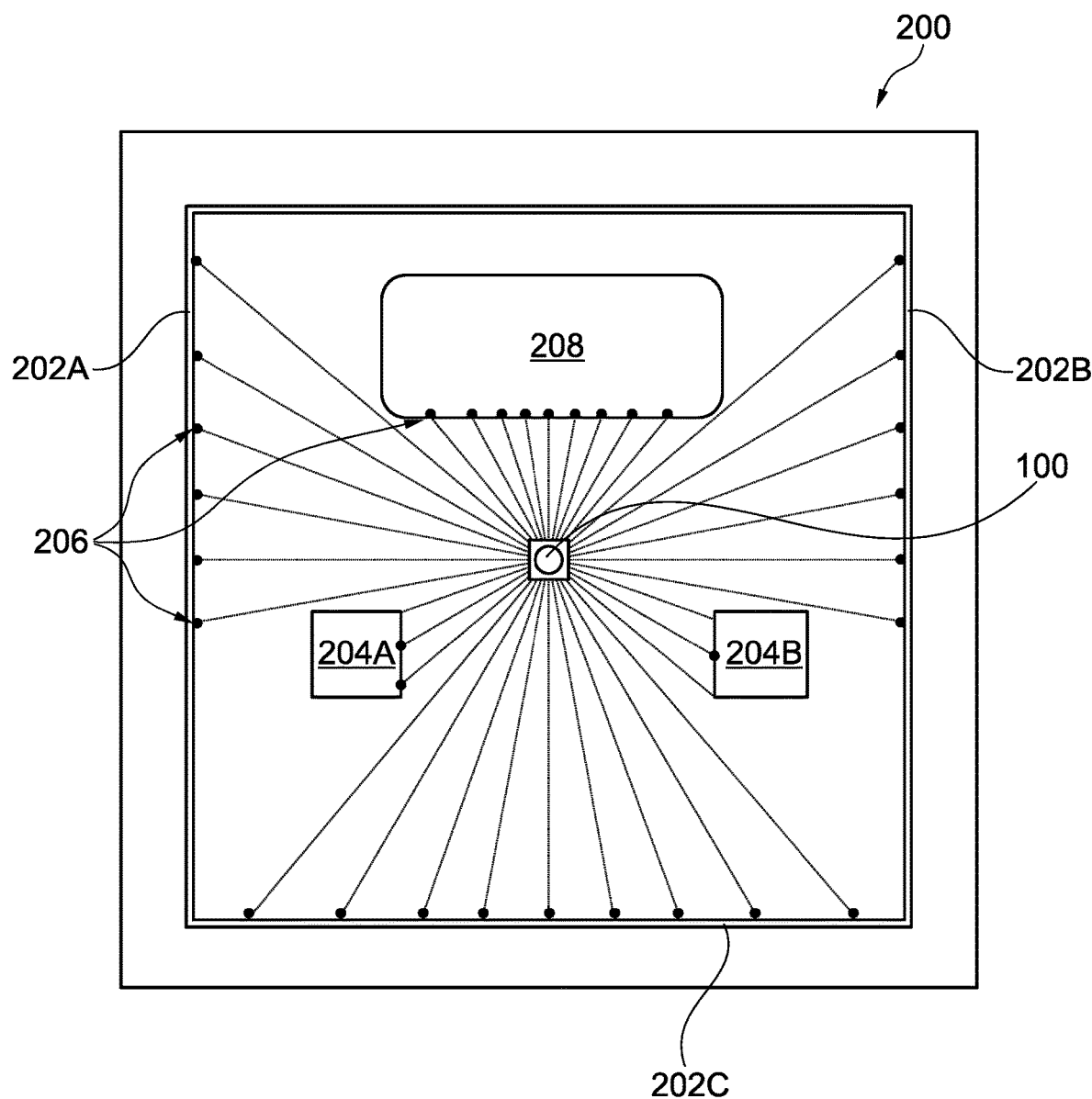
FIG. 3 depicts use of the unit depicted in FIG. 2 to detect and classify objects within an operating environment, in accordance with an embodiment of the disclosure.

With reference to FIG. 3, an example operating environment 200 in which static features (e.g., walls 202A, 202B, & 202C and columns 204A & 204B) have been augmented with retro-reflectors 206, is depicted in accordance with an embodiment of the disclosure. A two-dimensional LiDAR unit 100, generally positioned in the center of the operating environment 200 receives distinctly more intense (e.g., brighter) returns from the marked static features, as compared to unmarked dynamic features (e.g., couch 208). As such, the distinctive difference in intensities of the range data enable embodiments of the present disclosure to distinguish between static and dynamic features.

Clearly, other types of visible or optically determinable features may be used instead of or in addition to retro reflectors, such as a particular color of the feature. A simple manner of indicating to the robot which features are static would be to paint these with a particular color which no other features in the scene or venue are allowed to have.

In another embodiment, vision systems of the present disclosure can utilize a trained model method of classifying detected objects as being either a static or dynamic feature. In general, the trained model method of classification can be used to iteratively improve an assigned probability that a detected object is a static feature over the course of two or more navigations within an operating environment. Objects detected by the system which have not moved over the course of several navigations are assigned a higher probability of being a static feature, whereas objects which appear to move from navigation to navigation are assigned a lower probability of being a static feature (e.g., a higher likelihood of being a dynamic feature).

Autonomous machines typically use a variety of sensors as navigational aids while performing assigned tasks within an operating environment. Such sensors can include wheel encoders, LiDAR and vision systems such as 2-D and 3-D (e.g., stereo) cameras. Data streams from these sensors can be utilized in various combinations to build maps of the operating environment, which in some cases can be iteratively refined over multiple observations of or navigations through the same operating environment.

Figure 4A:
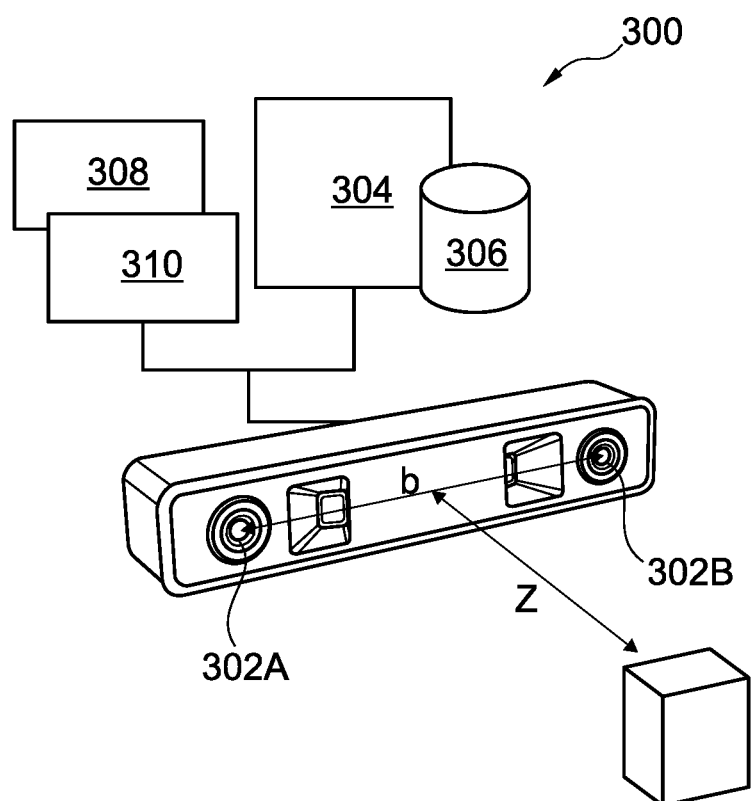
FIG. 4A is a system architecture diagram depicting a 3-D camera unit, in accordance with an embodiment of the disclosure.

For example, with reference to FIG. 4A, in one embodiment, a 3-D camera unit 300 can be employed to gather positional data for detected objects based on a rotation angle of the unit 300 and/or other orientation factors with respect to a navigational vehicle on which the unit 300 is mounted, as well as a calculated distance to the detected objects, which can be based on the principle of binocular disparity.

Figure 4B:
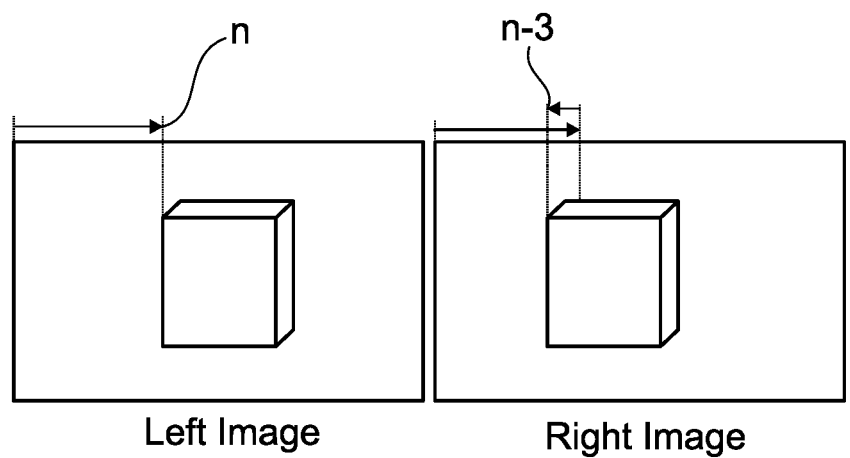
FIG. 4B depicts left and right images taken by the 3-D camera unit of FIG. 4A, in accordance with an embodiment of the disclosure.

In a typical 3-D camera unit 300, a left camera 302A and a right camera 302B are separated from one another by a fixed horizontal distance, typically referred to as a "baseline." With additional reference to FIG. 4B, observations by the left and right cameras 302A/B will have a slightly different view of the operating environment, which can be observed by an apparent horizontal shift of objects captured in the left and right images. Binocular disparity refers to the horizontal shift (e.g., difference in coordinates measured in pixels) of an identifiable feature of a detected object between the two images, which in turn can be used to determine a relative distance to the detected object.

In some embodiments, the unit 300 can employ a processor 304 communicating with a storage 306 to scan both the left and right images for a matching identifiable feature (e.g., a left edge of a detected object). Thereafter, the processor 304 can compute a disparity between the images as a general shift of the identifiable feature to the left in the right image. For example, an identifiable feature that appears in the nth pixel along the x-axis of the left image may be present in the nth-3 pixel along the x-axis of the right image. Accordingly, the disparity of the identifiable feature in the right image would be three pixels.

It should be noted that the use of a 3-D camera unit 300 to estimate distances to detected objects represents one exemplary embodiment of the present disclosure. Other mechanisms for estimating distances to detected objects are also contemplated. For example, embodiments of the present disclosure may use LiDAR (as discussed above), a 2-D camera unit with range finding capabilities, or other suitable approaches for determining distances to detected objects, which optionally can be used in combination for improved distance estimation capabilities.

Thereafter, the unit 300 can use the estimated distance in combination with positional information of the unit 300 gathered from a navigation module 308 and/or positional module 310 to construct a multidimensional understanding of the operating environment. In some embodiments, the multidimensional understanding can include the creation of a map including Cartesian and/or polar coordinate components. For example, in one embodiment, an operating environment can be broken up into an array of cells for mapping classification purposes.

Figure 5A:
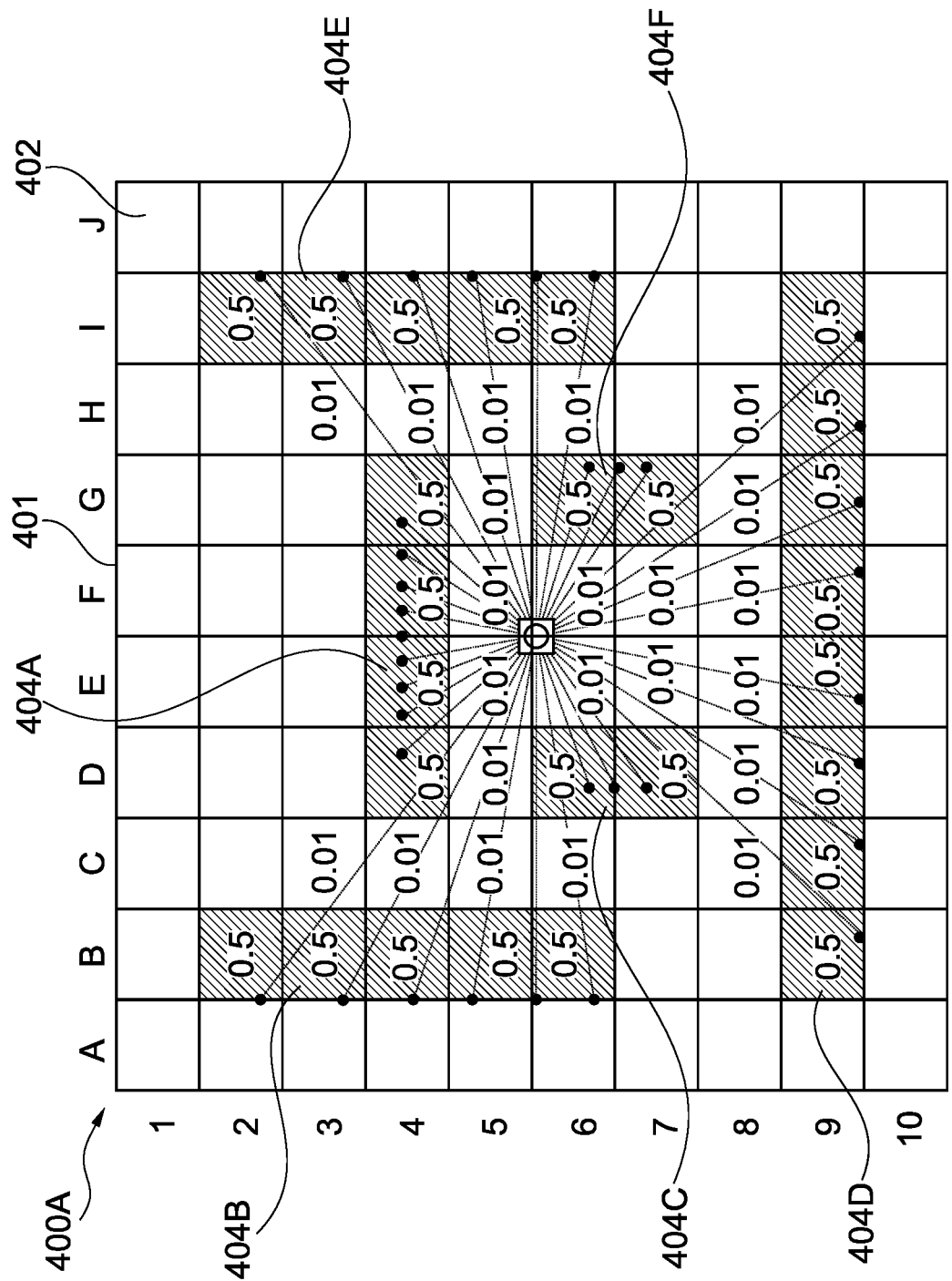
FIG. 5A-C depict the use of the 3-D camera of FIG. 4A to detect and classify objects within an operating environment, in accordance with an embodiment of the disclosure.

With reference to FIG. 5A, an initial map 400A (representing map n) of an operating environment 401, in which the operating environment 401 has been divided into an array of cells 402, is depicted in accordance with an embodiment of the disclosure. For simplicity, the operating environment 401 is divided into a 10×10 array of cells 402; in operation, the operating environment 401 may be divided into thousands of individual cells 402.

As depicted in FIG. 5A, during an initial scan, the unit 300 detects a plurality of objects 404 within the operating environment. Although the line of sight of the unit 300 may not extend to the full boundaries of the operating environment, the unit 300 can begin to designate individual cells 402 within the map 400A as being one of occupied, unseen or empty; although other designations of individual cells 402 are also contemplated, such as a probability that a feature or obstacle is positioned at the corresponding position. Although not depicted in FIG. 5A for simplicity, in some embodiments, as the unit 300 moves about the room during the course of navigation, the designations of the cells 402 can be updated, including re-designation of previously designated unseen cells as being either occupied or empty to create a more complete map 400 of the operating environment. Thereafter, cells 402 designated as either occupied or empty can be assigned an initial value representing a probability of being a static feature, with empty cells being assigned a low probability indicating that any object detected within that cell in a subsequent observation is likely a dynamic feature (which is subject to move). By contrast, the occupied cells can be assigned an initial, neutral value indicating some uncertainty as to whether the object detected within that cell is a static or dynamic feature.

Figure 5B:
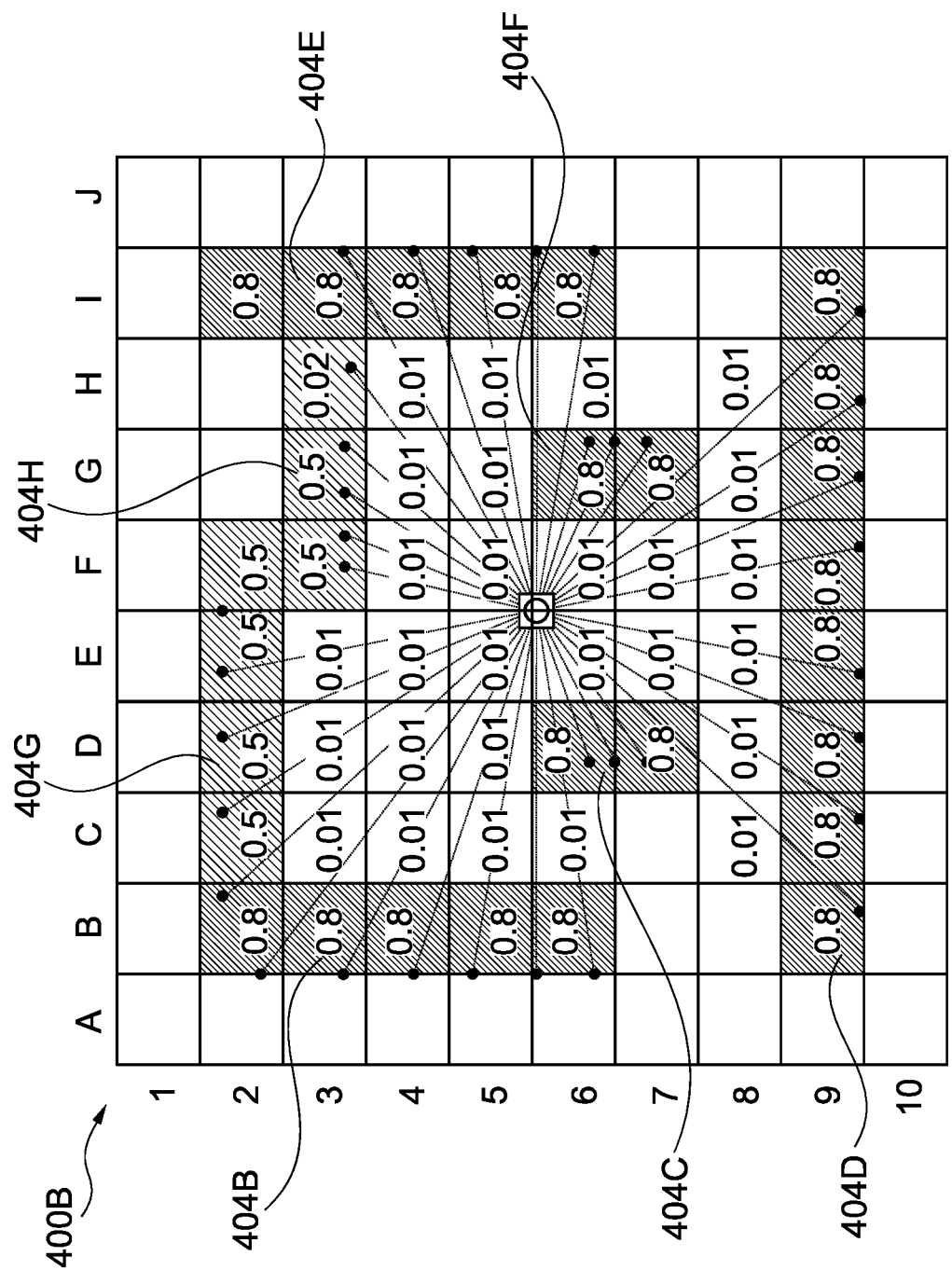

With reference to FIG. 5B, a subsequent map 400B (representing map n+1) can be created based on a subsequent observation within the operating environment, with the cells 402 again being designated as one of occupied, unseen or empty. In comparing the initial and subsequent maps 400A-B, it can be seen that one object 404A has disappeared, and two new objects 404G-H have appeared, with no apparent movement in the other previously detected objects 404B-F. Based on the comparison, the values previously assigned to the cells 402 representing a probability of the cell containing a static feature can be updated. In particular, the value for cells containing stationary objects 404B-F can be increased, representing an increase in confidence that the objects located within those cells are static features. The value for the now empty cells containing the previously detected object 404A can be decreased to indicate that the previously detected object 404A (as well as any object detected within those cells in a subsequent observation) is likely a dynamic feature. Newly detected objects 404G-H occupying cells previously designated as unoccupied or not observed can be assigned the initial, neutral value.

Figure 5C:
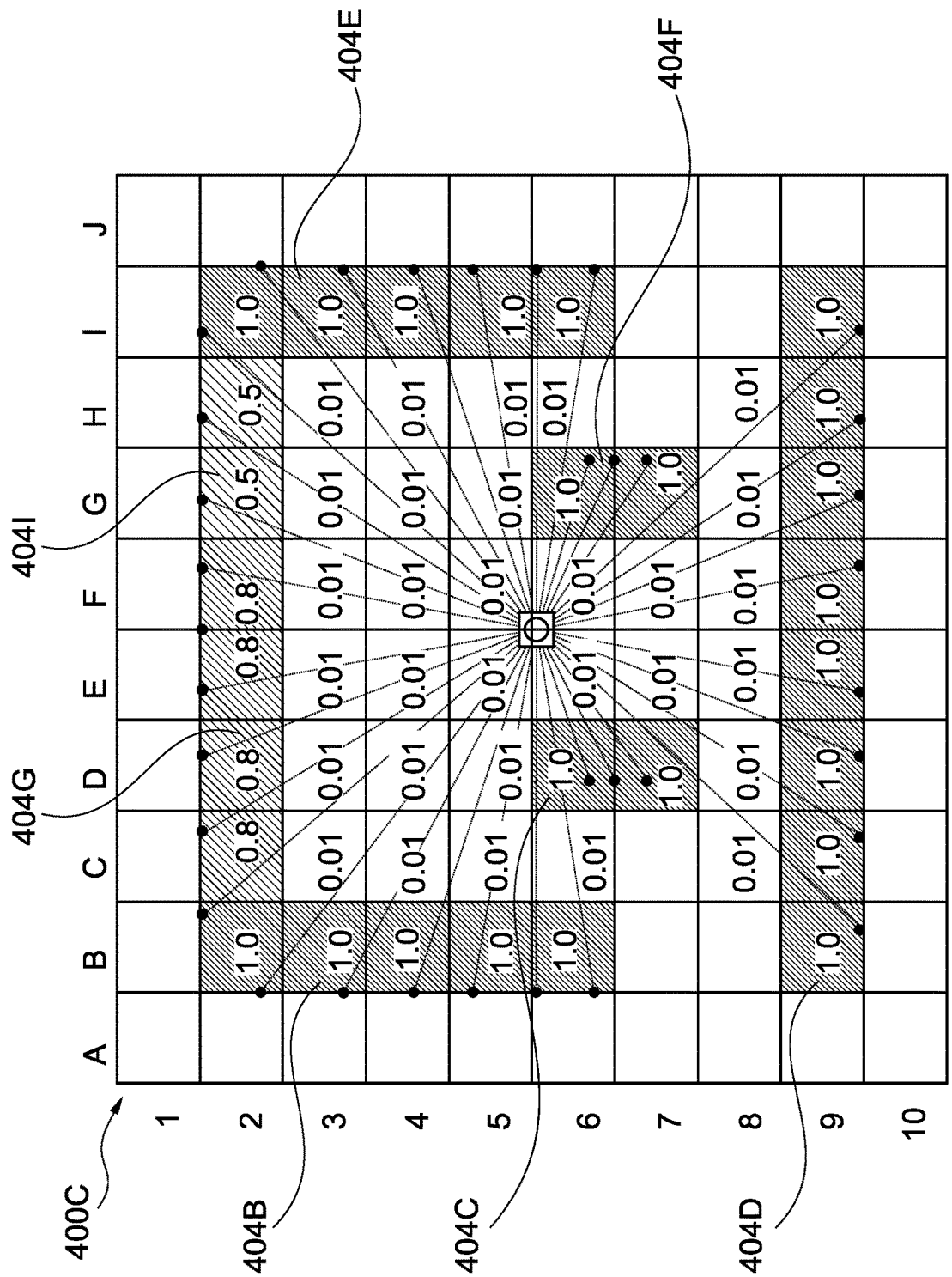

With reference to FIG. 5C, a second subsequent map 400C (representing map n+2) can be created based on additional observations within the operating environment, with the cells 402 again being designated as one of occupied, unseen or empty. In comparing the previous and subsequent maps 400B-C, it can be seen that object 404H has disappeared, and new object 404I has appeared, with no apparent movement in the other previously detected objects 404B-G. Accordingly, based on the comparison, the updated values previously assigned to the cells 402 representing a probability of the cell containing a static feature can be updated. In particular, the value for the now empty cells containing the previously detected object 404H can be decreased to indicate a low probability that those cells contain a static feature. Newly detected object 404I can be assigned the initial, neutral value, and the values for cells containing objects which have and continue to remain static can increase (eventually to a maximum) to reflect the overall level of confidence that the detected object occupying the cell represents a static feature.

Figure 6:
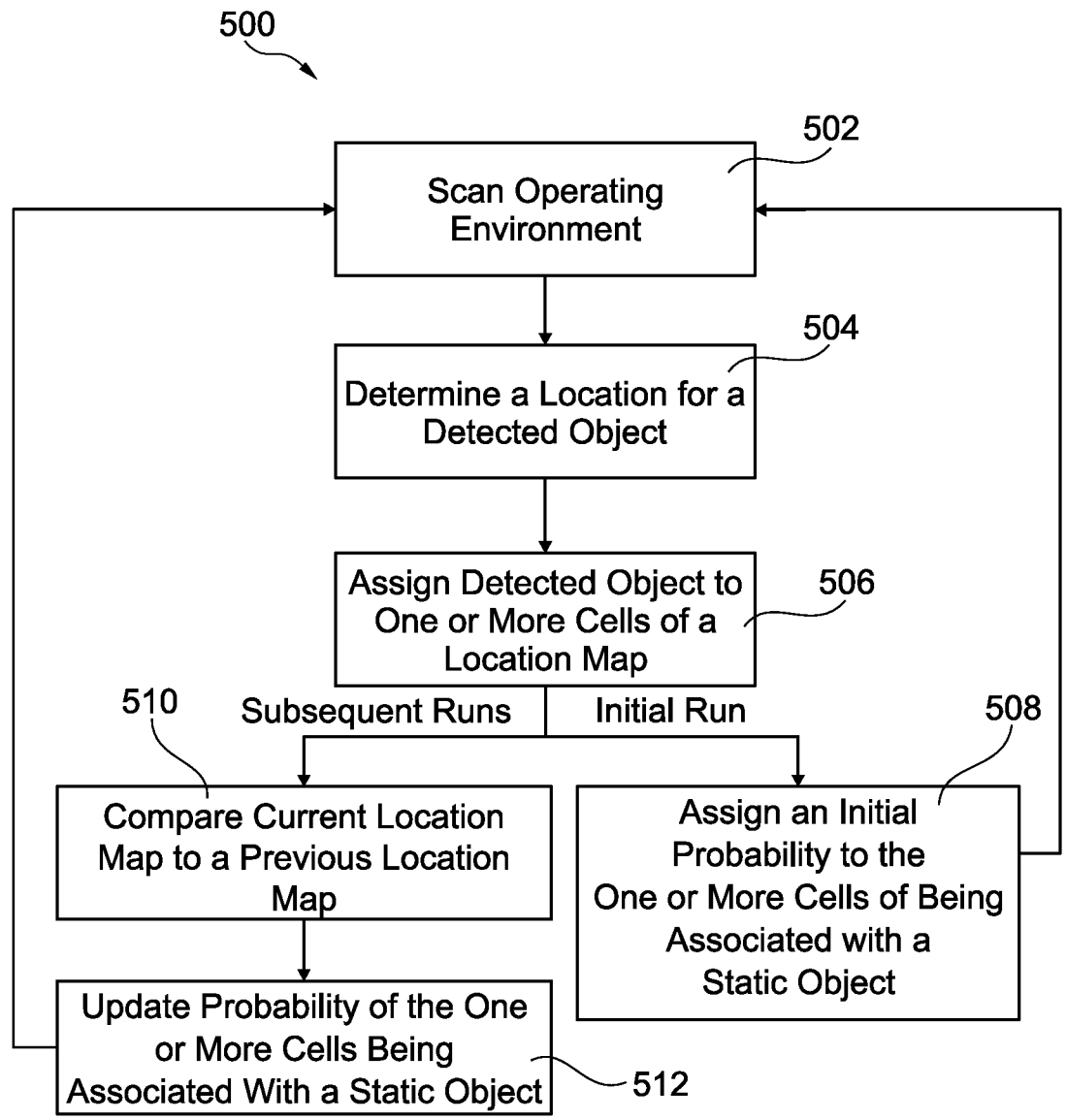
FIG. 6 is a flowchart depicting a method of classifying objects within an operating environment, in accordance with an embodiment of the disclosure.

With additional reference to FIG. 6, a flowchart for a trained model method 500 is depicted in accordance with an embodiment of the disclosure. At 502, unit 300 scans the operating environment for objects. At 504, the unit 300 determines a location for the detected objects, which can be assigned corresponding Cartesian and/or polar coordinates.

At 506, the detected object is assigned to one or more cells 402 of a map representing the operating environment. Classification of a detected object can occur locally (e.g., via an onboard computer) or remotely (e.g., in the cloud).

On an initial run, at 508, each of the cells in which a detected object was associated can be assigned an initial probability (e.g., 0.5) indicating a level of uncertainty as to whether the detected object represents a static object or a dynamic object. Cells where no object has been detected can be assigned a low probability (e.g., 0.01), indicating that later detected objects occupying that cell should initially be presumed to be a dynamic object. Thereafter, the method 500 can return to 502, for a subsequent scan of the operating environment.

On subsequent runs, at 510, the unit 300 can compare a current map (e.g., map 400B) with a previous map (e.g., map 400A) to determine if any of the detected objects have moved. At 512, the probabilities of the cells can be updated to reflect detected changes within the operating environment. For example, the probability for cells occupying a detected object which has not moved can be increased to a value (e.g., 0.8) representing an increased likelihood that the object occupying that cell is a static feature. Cells having an assigned value above a determined threshold (e.g., 0.8, 0.9, etc.) can be determined to be occupied by a static feature, while all other objects detected by the unit 300 in subsequent operations within the operating environment can be deemed dynamic features.

An initial probability (e.g., 0.5) can be assigned to newly detected objects occupying cells where no probability had previously been assigned. Thereafter, the method 500 can return to 502, for a subsequent scan of the operating environment. It should be understood that the individual steps used in the methods of the present approach or algorithm may be performed in any order and/or simultaneously, as long as the approach/algorithm remains operable. Furthermore, it should be understood that the apparatus and methods of the present approaches/algorithms can include any number, or all, of the described embodiments, as long as the approach/algorithm remains operable.

In another embodiment, vision systems of the present disclosure can utilize one or more automatic object recognition methods, for example via a deep learning algorithm, to classify detected objects as being either a static or dynamic feature. In some embodiments, certain aspects of the process (e.g., initial recognition and classification) can be performed manually, such as by an operator. In other situations, databases exist which comprise images of multiple products or features within each of the classes, so that the system may be trained on the basis of such databases.

In general, the automatic object recognition methods can use image data of the operating environment to automatically infer the type/class of object detected, to which an associated probability of being a static feature can be assigned. For example, a detected object recognized by the vision system to likely be a non-moving shelf, can be assigned a high probability of being a static feature. Objects detected by the vision system which cannot be positively identified by the automatic object recognition method can be assigned a lower probability of being a static feature (e.g., a higher likelihood of being a dynamic feature).

The object classification may be based on any type of data. A suitable type of detector is a camera, as objects are often easy to classify from their appearance. The camera may provide 2D or 3D data. 3D data may also be determined from a LiDAR or the like providing information relating to the structure or shape of the object, from which the classification may also be performed.

As described, the classification may initially be performed by an operator or other human correlating the data relating to a feature with the class or type thereof. Alternatively, databases of object classes exist which may be readily relied on. AI may then be used for correlating later data to the classes/types determined. The selection of a suitable type of AI and the training thereof is known to the skilled person. Examples include classifiers trained on examples from ImageNet, COCO, or other online databases. Specific object detection and classification architectures include neural networks, such as YOLO, classical learning methods like Haar cascades, and others.

Classifiers may also be trained by observation of the environment over time, or by reference to the permanence map described above, so that objects that show up in the same place all the time start to be recognized. For example, the robot may notice stanchions of pallet racks in the same place every time the robot navigates a warehouse. This consistency of appearance may then be used to train a classifier that associates things that look like stanchions with permanence. This association could then be used to help other robots correctly identify the permanence of stanchions on the first pass through the warehouse (or through other warehouses).

In one embodiment, AI may be used for identifying one, more or all features in the sensor output, such as an image. In one embodiment, a neural network or other AI may be used receiving the image and outputting an image or space plot in which one, more or all recognized or classified features are seen. Then, the staticness of such features may be illustrated or available. In one embodiment, a neural network has a number of nodes corresponding to the number of pixels in the image so that each node receives the information from a separate pixel. The output of the neural network may then relate to the features identified or classified and potentially also a staticness thereof.

Further, in some embodiments, various combinations of the described retroreflectors, trained model and automatic object recognition methods can be employed to properly classify features as being either static or dynamic. For example, in some embodiments, the retro-reflector and/or trained model approaches can be utilized to provide training data for the automatic object recognition method over the course of multiple training epochs. Feature classification can gradually shift towards automatic object recognition, after the respective weights and biases of the deep learning algorithm have been appropriately tuned. In some embodiments, various elements of the described LiDAR unit 100, 3-D camera unit 300, and automatic object recognition system 600 can be shared. For example, in some embodiments, a single unit comprising one or more of the LiDAR unit, 3-D camera unit and/or automatic recognition system can be constructed, in which the various features share a common processor database and/or optical unit. The invention is further illustrated by the following embodiments:

An indoor mobile industrial robot system configured to classify a detected object within an operating environment as likely being either one of a static feature or a dynamic feature, the indoor mobile industrial robot system comprising: a mobile robotic platform configured to self-navigate within an operating environment; a LiDAR unit operably coupled to the mobile robotic platform and configured to emit light energy and receive reflected light energy from the detected object; a positional module configured to account for at least one of a position and/or rotation angle of the LiDAR unit with respect to the mobile robotic platform; and a processor configured to translate the received reflected light energy and information from the positional module into a set of data points representing the detected object having at least one of Cartesian and/or polar coordinates, and an intensity, wherein if any discrete data point within the set of data points representing the detected object has an intensity at or above a defined threshold, the entire set of data points is classified representing a static feature, otherwise such set of data points is classified as representing a dynamic feature.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

EMBODIMENTS

1. A navigation system for navigating a robot unit, comprising one or more remote sensors, in a scene or venue, the scene/venue comprising a number of features, the system comprising a controller configured to:
at each of a plurality of points of time:
receive an output from the sensor(s),
determine, from the output, a plurality of features, and determine a position of each determined feature, and
allocate, to each recognized feature, a weight increasing with a number of points in time at which the feature is determined at at least substantially a same position and
determine a position of the robot unit vis-à-vis the position(s) of the determined feature(s) based on the weight allocated to each feature.

2. The navigation system according to embodiment 1, wherein the controller is further configured to determine the position only from feature(s) having a weight above a threshold weight.

3. The navigation system according to embodiment 1 or 2, further comprising a storage comprising information representing a position of each of a number of the features.

4. The navigation system according to embodiment 3, wherein the controller is configured to recognize a determined feature as static by the feature being represented in the storage.

5. The navigation system according to embodiment 3 or 4, wherein the controller is configured to determine a position of the robot unit in the scene or venue based on the information of the storage and the determined position of the robot unit vis-à-vis the recognized feature(s) represented in the storage.

6. The navigation system according to embodiment 3, 4 or 5, wherein the controller is configured to update the storage with information representing a recognized feature.

8. A navigation system for navigating a robot unit, comprising one or more remote sensors, in a scene or venue, the scene/venue comprising a number of features, the system comprising a controller configured to:
receive an output from the sensor(s),
determine, from the output, a plurality of features,
determine a position of each determined feature,
allocate a weight to each recognized feature which:
emits or reflects an amount of radiation exceeding a predetermined minimum intensity, or
emits or reflects radiation at a predetermined wavelength and.
determine a position of the robot unit vis-à-vis the position(s) of the determined feature(s) based on the weight allocated to the feature(s).

9. A navigation system for navigating a robot unit, comprising one or more remote sensors, in a scene or venue, the scene/venue comprising a number of features, the system comprising a controller configured to:
receive an output from the sensor(s),
determine, from the output, a plurality of features, and determine a position of each determined feature,
determine from the output, information representing a visible characteristic of each feature and
allocate a weight to features with one or more of a plurality of predetermined visible characteristics and
determine a position of the robot unit vis-à-vis the position(s) of the determined feature(s) based on the weight allocated to the feature(s).

10. A navigation system for navigating a robot unit, comprising one or more remote sensors, in a scene or venue, the scene/venue comprising a number of features, the system comprising a controller configured to:
receive an output from the sensor(s),
determine, from the output, a plurality of features, and determine a position of each determined feature,
determine from the output, one or more predetermined surface characteristics of a determined feature and
compare the surface characteristics of the determined feature to predetermined surface characteristics and
allocate a predetermined weight to the determined feature if the comparison identifies a match and
determine a position of the robot unit vis-à-vis the position(s) of the determined feature(s) based on the weight allocated to the feature(s).

11. A navigation system for navigating a robot unit, comprising one or more remote sensors, in a scene or venue, the scene/venue comprising a number of features, the system comprising a controller and a storage available to the controller and in which information is stored relating to each category of a plurality of feature categories,
wherein the controller is configured to:
receive an output from the sensor(s),
determine, from the output, a plurality of features, and determine a position of each determined feature,
categorize a feature into a first category of the plurality of categories,
compare the first category to information of the storage and allocate a predetermined weight to the determined feature based on the comparison and
determine a position of the robot unit vis-à-vis the position(s) of the determined feature(s) based on the weight allocated to the feature(s).

12. A method of operating a navigation system for navigating a robot unit in a scene or venue, the scene/venue comprising a number of static features and a number of dynamic features, the method comprising:
at each of a plurality of points of time:
one or more remote sensors of the robot unit outputting information representing surroundings of the robot unit,
determining, from the information, a plurality of features,
determining a position of each feature, and
allocating, to each recognized static feature, a weight increasing with a number of points in time at which the feature is determined at at least substantially a same position, and
determining a position of the robot unit vis-à-vis the recognized static feature(s) based on the weight allocated to the pertaining recognized feature(s).

13. The method according to embodiment 12, further comprising determining the position only from the feature(s) having a weight above a threshold value.

14. The method according to embodiment 12 or 13, further comprising providing a storage comprising information representing a position of each of a number of the features.

15. The method according to embodiment 14, wherein the recognizing step comprises recognizing a determined feature as static by the feature being represented in the storage.

16. The method according to embodiment 14 or 15, further comprising the step of determining a position of the navigation system unit in the scene or venue based on the information of the storage and the determined position of the navigation system unit vis-à-vis the recognized feature(s) represented in the storage.

17. The method according to embodiment 14, 15 or 16, further comprising the step of updating the storage with information representing a recognized feature.

18. The method according to any of embodiments 12-17, further comprising a step of recognizing a feature as a static feature when the feature is positioned at at least substantially the same position at at least a predetermined minimum number of points in time.

19. A method of operating a navigation system for navigating a robot unit in a scene or venue, the scene/venue comprising a number of static features and a number of dynamic features, each feature being configured to:
emit or reflect an amount of radiation exceeding a predetermined minimum intensity, or
emit or reflect radiation at a predetermined wavelength.
the method comprising:
one or more remote sensors of the robot unit outputting information representing surroundings of the robot unit and radiation received from the features,
determining, from the information, a plurality of features and positions thereof,
allocating a predetermined weight to features based on the amount or wavelength of radiation emitted/reflected by the feature and
determining a position of the robot unit vis-à-vis the recognized static feature(s) based on the weight allocated to the pertaining recognized feature(s).

The method according to any of embodiments 12-18, wherein the step of allocating a weight comprises allocating a predetermined weight to features which:
emit or reflect an amount of radiation exceeding a predetermined minimum intensity, or
emit or reflect radiation at a predetermined wavelength.

20. A method of operating a navigation system for navigating a robot unit in a scene or venue, the scene/venue comprising a number of static features and a number of dynamic features, the method comprising:
one or more remote sensors of the robot unit outputting information representing surroundings of the robot unit, the information comprising information representing a visible characteristic of each feature,
determining, from the information, a plurality of features and positions thereof,
allocating a predetermined weight to features with one of a plurality of predetermined visible characteristics and
determining a position of the robot unit vis-à-vis the recognized static feature(s) based on the weight allocated to the pertaining recognized feature(s).

21. The method according to embodiment 20, further comprising the steps of:
the sensor(s) outputting information representing a new visible characteristics of a feature,
receipt of information relating to a weight of the feature and
including the new visible characteristic to the plurality of predetermined visible characteristics.

22. A method of operating a navigation system for navigating a robot unit in a scene or venue, the scene/venue comprising a number of static features and a number of dynamic features, the method comprising:
one or more remote sensors of the robot unit outputting information representing surroundings of the robot unit,
determining, from the information, a plurality of features and positions thereof,
the one or more remote sensors of the robot unit detecting one or more predetermined surface characteristics of a determined feature and
allocating a weight to a feature based on a comparison between the surface characteristics of the determined feature and predetermined surface characteristics and
determining a position of the robot unit vis-à-vis the recognized static feature(s) based on the weight allocated to the pertaining recognized feature(s).

23. A method of operating a navigation system for navigating a robot unit in a scene or venue, the scene/venue comprising a number of static features and a number of dynamic features, the method comprising:
one or more remote sensors of the robot unit outputting information representing surroundings of the robot unit,
determining, from the information, a plurality of features and positions thereof,
based on the information output, categorizing at least one feature into a first category of the plurality of categories,
allocating a predetermined weight to a determined feature if information is available, relating to the first category, reflecting that features of the first category are static features and
determining a position of the robot unit vis-à-vis the recognized static feature(s) based on the weight allocated to the pertaining recognized feature(s).

24. A navigation system for navigating a robot unit, comprising one or more remote sensors, in a scene or venue, the scene/venue comprising a number of static features and a number of dynamic features, the system comprising a controller configured to:
receive an output from the sensor(s),
a plurality of times:
determine, from the output, an occupancy of each of a plurality of positions in the scene/venue, and
store the occupancies determined, and
determine, based on the stored occupancies, for each of the plurality of positions, a predicted occupancy of each position in the scene/venue from the stored occupancies and
determine a position of the robot unit in the scene or venue based on positions having a predicted occupancy above a predetermined minimum occupancy.

25. A system according to embodiment 24, wherein a predicted occupancy of a position is determined based on the occupancies determined for the pertaining position.

26. A method of navigating a robot unit, comprising one or more remote sensors, in a scene or venue, the scene/venue comprising a number of static features and a number of dynamic features, the system comprising a controller configured to:
receive an output from the sensor(s), a plurality of times:
  determining, from the output, an occupancy of each of a plurality of positions in the scene/venue,
  storing the occupancies determined, and
  determining, for each of the plurality of positions, a predicted occupancy of each position in the scene/venue from the stored occupancies and
  determining a position of the robot unit in the scene or venue based on positions having a predicted occupancy above a predetermined minimum occupancy.

27. A method according to embodiment 26, wherein the robot unit performs a plurality of operations over time in the scene/venue and where the steps of determining the occupancies and storing the occupancies are performed for each of a plurality of distinct operations.

The invention claimed is:

1. A navigation system for navigating a robot unit in a scene or venue, the robot unit comprising one or more remote sensors, the scene or venue comprising a number of static and dynamic features, the system comprising:
   a storage having information representing a position of each of the number of features, and
   a controller configured to:
     at each of a plurality of points of time:
       receive an output from the one or more remote sensors,
       determine, from the output, a plurality of the features, and
       determine a position of each determined feature, and
     for each of a plurality of runs of the system, allocate, to each recognized feature, a weight increasing for each run in which the feature is determined at at least substantially a same position and decreasing for each run in which the feature is not determined at said position,
     increase or decrease the weight, for each feature, only once when the feature is determined to be in the same position or not in the same position multiple times during a single run,
     update the storage with the allocated weights,
     determine a position of the robot unit vis-à-vis the position of the determined feature based on the weight allocated to the features, and
     navigate the robot unit about the scene or venue.

2. The navigation system according to claim 1, wherein the controller is further configured to determine the position only from the feature having a weight above a threshold weight.

3. The navigation system according to claim 1, wherein the controller is configured to recognize a determined feature as static by the feature being represented in the storage.

4. The navigation system according to claim 1, wherein the controller is configured to determine a position of the robot unit in the scene or venue based on the information of the storage and the determined position of the robot unit vis-à-vis the recognized feature represented in the storage.

5. The navigation system according to claim 1, wherein the controller is configured to recognize a feature as a static feature when the feature is positioned at at least substantially the same position at at least a predetermined minimum number of points in time.

6. A method of operating a navigation system for navigating a robot unit in a scene or venue, the scene or venue comprising a number of static features and a number of dynamic features, the method comprising:
   at each of a plurality of points of time:
     outputting information, from one or more remote sensors of the robot unit, representing surroundings of the robot unit,
     determining, from the information, a plurality of the features, and
     determining a position of each feature, and
   for each of a plurality of runs of the system, allocating, to each recognized feature, a weight increasing for each run in which the feature is determined at at least substantially a same position and decreasing for each run in which the feature is not determined at said position,
   increasing or decreasing the weight, for each feature, only once when the feature is determined to be in the same position, or not in the same position, multiple times during a single run,
   updating a storage with the weights allocated to each recognized feature,
   determining a position of the robot unit vis-à-vis the positions of the features based on the weight allocated to the recognized features, and
   navigating the robot unit about the scene or venue.

7. The method according to claim 6, further comprising determining the position of the robot only from the feature having a weight above a threshold value.

8. The method according to claim 6, wherein the step of allocating a weight increasing comprises recognizing a determined feature as static by the feature being represented in the storage.

9. The method according to claim 6, further comprising the step of determining a position of the navigation system unit in the scene or venue based on the information of the storage and the determined position of the navigation system unit vis-à-vis the recognized feature represented in the storage.

* * * * *